(12) United States Patent
Shoji et al.

(10) Patent No.: US 8,154,542 B2
(45) Date of Patent: Apr. 10, 2012

(54) PLASMA DISPLAY DEVICE AND PLASMA-DISPLAY-PANEL DRIVING METHOD

(75) Inventors: Hidehiko Shoji, Osaka (JP); Takahiko Origuchi, Osaka (JP); Mitsuo Ueda, Hyogo (JP)

(73) Assignee: Panasonic Corporation, Osaka (JP)

( * ) Notice: Subject to any disclaimer, the term of this patent is extended or adjusted under 35 U.S.C. 154(b) by 898 days.

(21) Appl. No.: 12/088,783

(22) PCT Filed: Feb. 5, 2007

(86) PCT No.: PCT/JP2007/051910
§ 371 (c)(1),
(2), (4) Date: Mar. 31, 2008

(87) PCT Pub. No.: WO2007/091514
PCT Pub. Date: Aug. 16, 2007

(65) Prior Publication Data
US 2009/0135172 A1 May 28, 2009

(30) Foreign Application Priority Data

Feb. 6, 2006 (JP) .................................. 2006-028074
Dec. 28, 2006 (JP) .................................. 2006-354273

(51) Int. Cl.
*G09G 5/00* (2006.01)
(52) U.S. Cl. .......................................... 345/212; 345/60
(58) Field of Classification Search .............. 345/60–72, 345/98–100, 211–212; 315/169.1, 169.4
See application file for complete search history.

(56) References Cited

U.S. PATENT DOCUMENTS 6,466,186 B1 10/2002 Shimizu et al.
6,512,501 B1 1/2003 Nagaoka et al.
(Continued)

FOREIGN PATENT DOCUMENTS

CN 2007-80001069.4 3/2010
(Continued)

OTHER PUBLICATIONS

International Search Report for International Application No. PCT/JP2007/051910 dated Mar. 13, 2007.

*Primary Examiner* — Kevin M Nguyen
*Assistant Examiner* — Kenneth B Lee, Jr.
(74) *Attorney, Agent, or Firm* — RatnerPrestia

(57) ABSTRACT

In a plasma-display-panel driving method, a field period is divided into a plurality of sub fields, each of which has an address period for allowing discharge cells to selectively generate an address discharge and a sustain period for allowing the discharge cells having generated the address discharge to generate a sustain discharge by a number of times corresponding to a brightness weight. In the sustain period, a period for setting display electrode pairs to the base potential is disposed between the sustain pulse for causing the final sustain discharge in the sustain period and the previous sustain pulse. In a time interval corresponding to the lighting ratio of the discharge cells in the sub field after applying to the display electrode pairs a voltage for generating the final sustain discharge, a voltage for reducing the potential difference between electrodes of the display electrode pairs is applied to the display electrode pairs. Accordingly, it is possible to generate a stable address discharge and thus to reduce a crosstalk without increasing the voltage for generating the address discharge.

14 Claims, 16 Drawing Sheets

U.S. PATENT DOCUMENTS

| | | |
|---|---|---|
| 7,133,008 B2 | 11/2006 | Naganuma |
| 7,358,931 B2 | 4/2008 | Mizobata et al. |
| 7,453,423 B2 | 11/2008 | Mizobata |
| 7,468,713 B2 | 12/2008 | Ogawa et al. |
| 7,471,264 B2 | 12/2008 | Inoue et al. |
| 7,532,177 B2 | 5/2009 | Kwon et al. |
| 7,688,287 B2 | 3/2010 | Tokunaga et al. |
| 7,924,239 B2 * | 4/2011 | Yoshihama et al. ............ 345/60 |
| 2002/0195963 A1 | 12/2002 | Tokunaga et al. |
| 2003/0001804 A1 * | 1/2003 | Naganuma ................... 345/63 |
| 2005/0068262 A1 | 3/2005 | Mizobata et al. |
| 2005/0162348 A1 | 7/2005 | Ogawa et al. |
| 2005/0231440 A1 | 10/2005 | Inoue et al. |
| 2005/0285820 A1 | 12/2005 | Inoue et al. |
| 2006/0022602 A1 | 2/2006 | Han |
| 2006/0066518 A1 | 3/2006 | Mizobata |
| 2006/0066519 A1 | 3/2006 | Tokunaga et al. |
| 2006/0152442 A1 | 7/2006 | Chi |
| 2007/0097032 A1 * | 5/2007 | Lim et al. ....................... 345/68 |

FOREIGN PATENT DOCUMENTS

| | | | |
|---|---|---|---|
| EP | 1 274 064 A2 | | 1/2003 |
| EP | 1 528 531 A2 | | 5/2005 |
| EP | 1 587 051 A2 | | 10/2005 |
| EP | 07 70 8028 | | 1/2010 |
| EP | 10 15 8691 | | 7/2010 |
| JP | 11-133913 A | | 5/1999 |
| JP | 2000-181404 A | | 6/2000 |
| JP | 2000-242224 A | | 9/2000 |
| JP | 2001-228821 A | | 8/2001 |
| JP | 2001-272946 A | | 10/2001 |
| JP | 2002-366090 A | | 12/2002 |
| JP | 2003-15590 A | | 1/2003 |
| JP | 2003-122294 A | | 4/2003 |
| JP | 2003-255887 A | | 9/2003 |
| JP | 2003255887 A | * | 9/2003 |
| JP | 2004-206094 A | | 7/2004 |
| JP | 2005-010227 A | | 1/2005 |
| JP | 2005-77744 A | | 3/2005 |
| JP | 2005-234372 A | | 9/2005 |
| JP | 2006-003398 A | | 1/2006 |
| JP | 2006-031024 A | | 2/2006 |
| JP | 2006-91133 A | | 4/2006 |
| JP | 2006-91437 A | | 4/2006 |
| JP | 2006-201735 A | | 8/2006 |
| JP | 2007-557826 | | 3/2011 |
| JP | 2008-524297 | | 7/2011 |
| KR | 2000-0023483 A | | 4/2000 |
| KR | 10-2005-0069762 A | | 7/2005 |
| KR | 10-2008-7007830 | | 8/2009 |

* cited by examiner

FIG. 5

| Lighting ratio(%) | Erasing phase difference Th1 |
|---|---|
| 0 ~ 44 (not included) | 150 nsec |
| 44 (included) ~ 100 | 300 nsec |

| Lighting ratio (%) | Ground period Th3 |
|---|---|
| 0 ~ 44 (not included) | 0 nsec |
| 44 (included) ~ 100 | 500 nsec |

| Accumulated electrification time | Ground period ThG |
|---|---|
| Less than or equal to 500 hours | 0 nsec |
| More than 500 hours | 500 nsec |

PLASMA DISPLAY DEVICE AND PLASMA-DISPLAY-PANEL DRIVING METHOD

This Application is a U.S. National Phase Application of PCT International Application PCT/JP2007/051910.

TECHNICAL FIELD

The present invention relates to a plasma display device used in a wall-mounted television or a large-scaled monitor and a plasma-display-panel driving method.

BACKGROUND ART

In an AC surface discharge panel representative of a plasma display panel (hereinafter, simply referred to as "panel"), plural discharge cells are formed between a front substrate and a rear substrate opposed to each other. In the front substrate, plural display electrode pairs each including a scan electrode and a sustain electrode are on a front glass substrate to be parallel to each other and a dielectric layer and a protective layer are formed to cover the display electrode pairs. In the rear substrate, plural parallel data electrodes are formed on a rear glass substrate, a dielectric layer is formed to cover the data electrode, plural barrier ribs are formed thereon to be parallel to the data electrodes, and a phosphor layer is formed on the surface of the dielectric layer and on the side surfaces of the barrier ribs. The front substrate and the rear substrate are opposed to each other so that the display electrode pairs and the data electrodes three-dimensionally intersect each other and are sealed in this state. For example, a discharging gas including 5% of xenon in partial pressure ratio is enclosed in an inner discharge space. Here, discharge cells are formed at positions where the display electrode pairs and the data electrodes are opposed to each other. In the panel having the above-mentioned configuration, ultraviolet rays are generated in the discharge cells by a gaseous discharge and fluorescent substances of red (R), green (G), and blue (B) are excited to emit light by the use of the ultraviolet rays, thereby performing a color display.

As a method of driving the panel, a sub field method, that is, a method of dividing a field period into plural sub fields and performing a gray scale display by combinations of sub fields to emit light, is usually used.

Each sub field includes an initializing period, an address period, and a sustain period. In the initializing period, an initializing discharge is generated, wall charges required for a subsequent address operation are formed on the electrodes, and prime particles (a priming for discharge=excited particles) for stably generating an address discharge are created. In the address period, an address discharge is generated to form wall charges by selectively applying an address pulse voltage to the discharge cells to be displayed (hereinafter, also referred to as "addressing"). In the sustain period, a sustain pulse voltage is alternately applied to the display electrode pairs each including a scan electrode and a sustain electrode, a sustain discharge is generated in the discharge cells having generated the address discharge, and the phosphor layer of the corresponding discharge cells is made to emit light, thereby displaying an image.

The sub field method includes a new driving method of generating an initializing discharge by the use of a voltage waveform smoothly varying and selectively generating an initialing discharge in the discharge cells having generated the sustain discharge, thereby greatly reducing the emission of light not associated with a gray scale display to improve a contrast ratio.

In this driving method, an initializing operation (hereinafter, referred to as "all-cell initializing operation") of generating an initializing discharge in all the discharge cells is performed in the initializing period of one sub field among the plural sub fields and an initializing operation (hereinafter, referred to as "selection initializing operation") of generating the initializing discharge in only the discharge cells having generated the sustain discharge is performed in the initializing period of the other sub fields. By driving in this way, the emission of light not associated with an image display includes only the emission of light associated with the discharge of the all-cell initializing operation and thus the brightness (hereinafter, referred to as "black brightness") of a black display area not displaying an image is made by only the weak emission of light of the all-cell initializing operation, thereby displaying an image with high contrast (for example, see Patent Document 1).

Patent Document 1 discloses a so-called narrow erasing discharge in which the pulse width of the final sustain pulse in the sustain period is set to be smaller than the pulse width of the other sustain pulse so as to reduce a potential difference due to the wall charges between the display electrode pairs. By stably generating the narrow erasing discharge, it is possible to reliably perform an address operation in an address period in the subsequent sub field and thus to provide a plasma display device with a high contrast ratio.

However, with an increase in screen size or an increase in brightness of a panel, the narrow erasing discharge tends to get unstable. Accordingly, the address discharge gets unstable and there are thus problems in that the address discharge may not be generated in the discharged cells to perform a display to deteriorate image display quality or that a voltage for generating the address discharge may be raised. When a voltage applied to the discharge cells is raised to stably generate the discharge, a so-called crosstalk that a discharge is generated in the discharge cells not having subjected to the address operation due to the influence from adjacent discharge cells and thus the image display quality is deteriorated. In addition, since a discharge characteristic of the panel varies depending on an accumulated time of a time period when the panel is electrified (hereinafter, also referred to as "accumulated electrification time"), it is not easy to control a stable address operation with the optimum condition regardless of the accumulated electrification time.

The invention is contrived in view of the above-mentioned problems. An object of the invention is to provide a plasma display device and a panel driving method that can generate a stable address discharge in a large-screen and high-brightness panel without increasing a voltage for generating the address discharge and that can reduce a crosstalk, thereby improving image display quality. Another object of the invention is to provide a plasma display device and a plasma-display-panel driving method that can generate a stable address discharge in a high-brightness panel without increasing a voltage for generating the address discharge, regardless of an accumulated electrification time for the panel, thereby improving image display quality.

Patent Document 1: Japanese Patent Unexamined Publication No. 2000-242224

DISCLOSURE OF THE INVENTION

According to an aspect of the invention, there is provided a plasma display device including: a plasma display panel having a plurality of discharge cells, each discharge cell having a display electrode pair formed of a scan electrode and a sustain electrode; and a driving circuit driving the plasma display panel by dividing a field period into a plurality of sub fields, each sub field having an address period for selecting the discharge cell to emit light and a sustain period for allowing the discharge cell selected in the address period to generate a sustain discharge. Here, the driving circuit includes: a sustain pulse generating circuit that has a power recovery circuit recovering power accumulated in inter-electrode capacitors of the display electrode pairs and supplying the recovered power to the display electrode pairs and a clamp circuit having a switching element clamping the display electrode pairs to a source voltage and a switching element clamping the display electrode pairs to a base potential; and a switching element applying to the display electrode pairs a voltage for reducing a potential difference between the display electrode pairs. The sustain pulse generating circuit alternately applies to the display electrode pairs a sustain pulse varying from the base potential to a potential causing a sustain discharge in the sustain period and disposing a period for setting the display electrode pairs to the base potential between the sustain pulse for causing the final sustain discharge in the sustain period and the previous sustain pulse.

According to this configuration, it is possible to reduce a crosstalk, thereby improving image display quality.

The plasma display device may further include an accumulated time measuring circuit measuring an accumulated time of the time when the plasma display panel is electrified. Here, the period for setting the display electrode pairs to the base potential between the sustain pulse for causing the final sustain discharge in the sustain period and the previous sustain pulse may be changed depending on the accumulated time measured by the accumulated time measuring circuit.

According to this configuration, it is possible to generate a stable address discharge in a high-brightness panel, without increasing a voltage for generating the address discharge, regardless of the accumulated electrification time of the panel.

According to another aspect of the invention, there is provided a plasma-display-panel driving method, the plasma display panel having a plurality of discharge cells, each discharge cell having a display electrode pair formed of a scan electrode and a sustain electrode, a field period being divided into a plurality of sub fields, each sub field having an address period for allowing the discharge cells to selectively generate an address discharge and a sustain period for allowing the discharge cells having generated the address discharge to generate a sustain discharge by a number of times corresponding to a brightness weight. The plasma-display-panel driving method includes the steps of: applying to the display electrode pairs a sustain pulse varying from a base potential to a potential causing the sustain discharge in the sustain period; and disposing a period for setting the display electrode pairs to the base potential between the sustain pulse for causing the final sustain discharge and the previous sustain pulse.

According to this method, it is possible to reduce a crosstalk, thereby improving image display quality.

The plasma-display-panel driving method may further include the steps of: measuring an accumulated time of the time when the plasma display panel is electrified; and changing the period for setting the display electrode pairs to the base potential depending on the measured accumulated time.

According to this configuration, it is possible to generate a stable address discharge in a high-brightness panel, without increasing a voltage for generating the address discharge, regardless of the accumulated electrification time of the panel.

BRIEF DESCRIPTION OF THE DRAWINGS

FIG. 5 is a diagram illustrating a relation between a lighting ratio and an erasing phase difference and a relation between the lighting ratio and a ground period according to the first embodiment of the invention.

Figure 1:
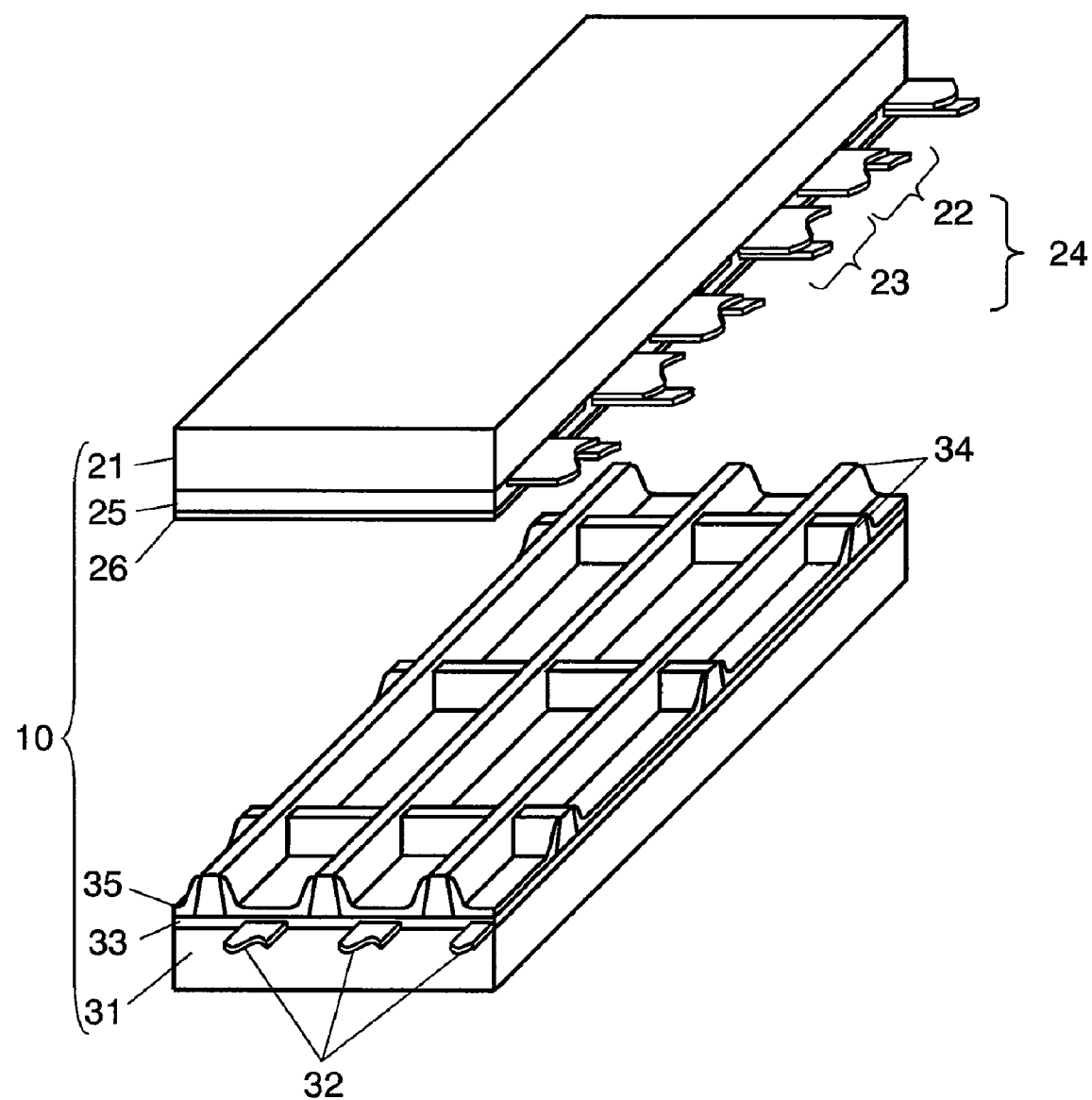
FIG. 1 is an exploded perspective view illustrating a part of a panel according to first and second embodiments of the invention.

DESCRIPTION OF REFERENCE NUMERALS AND SIGNALS 1, 2: PLASMA DISPLAY DEVICE
10: PANEL
21: FRONT SUBSTRATE
22: SCAN ELECTRODE
23: SUSTAIN ELECTRODE
24: DISPLAY ELECTRODE PAIR
25, 33: DIELECTRIC LAYER
26: PROTECTIVE LAYER
31: REAR SUBSTRATE
32: DATA ELECTRODE
34: BARRIER RIB
35: PHOSPHOR LAYER
41, 51: IMAGE SIGNAL PROCESSING CIRCUIT
45, 52: DATA ELECTRODE DRIVING CIRCUIT
43, 53: SCAN ELECTRODE DRIVING CIRCUIT
44, 54: SUSTAIN ELECTRODE DRIVING CIRCUIT
45, 55: TIMING GENERATING CIRCUIT
48: ACCUMULATED TIME MEASURING CIRCUIT
58: LIGHTING RATIO CALCULATING CIRCUIT
50, 60, 100, 200: SUSTAIN PULSE GENERATING CIRCUIT
56, 61: POWER RECOVERY CIRCUIT
110, 210: POWER RECOVERY SECTION
57, 62: CLAMP CIRCUIT
120, 220: CLAMP SECTION
81: TIMER
Q11, Q12, Q13, Q14, Q21, Q22, Q23, Q24, Q26, Q27, Q28, Q29: SWITCHING ELEMENT
C10, C20, C30: CAPACITOR
L10, L20: INDUCTOR
D11, D12, D21, D22, D30: DIODE

DETAILED DESCRIPTION OF THE PREFERRED EMBODIMENTS

First Embodiment

Hereinafter, a plasma display device according to a first embodiment of the invention will be described with reference to the drawings.

FIG. 1 is an exploded perspective view illustrating a structure of panel 10 according to a first embodiment of the invention. Plural display electrode pairs 24 each having scan electrode 22 and sustain electrode 23 are formed on front glass substrate 21. Dielectric layer 25 is formed to cover scan electrodes 22 and sustain electrodes 23 and protective layer 26 is formed on dielectric layer 25.

In order to lower a breakdown start voltage in discharge cell), protective layer 26 is formed of a material containing as a major component MgO which has been used as a material of a panel and which has a high secondary electron emission coefficient and an excellent durability when neon (Ne) and xenon (Xe) gases enclosed therein.

Plural data electrodes 32 are formed on rear substrate 31. Dielectric layer 33 is formed to cover data electrodes 32 and barrier ribs 34 having a mesh shape are formed thereon. Phosphor layer 35 emitting light of red (R), green (G), and blue (B) are formed on the side surfaces of barrier ribs 34 and on the surfaces of dielectric layer 33.

Front substrate 21 and rear substrate 31 are disposed with a minute discharge space therebetween so that display electrode pairs 24 and data electrodes 32 intersect each other and the outer circumferential portions are sealed with a sealing material such as glass frit. A mixture gas of neon and xenon is enclosed as a discharge gas in the discharge space. In the first embodiment, the discharge gas having about 10% of xenon in partial pressure is used to improve the brightness. The discharge space is partitioned into plural regions by barrier ribs 34 and discharge cells are formed at positions where the display electrode pairs 24 and data electrodes 32 intersect each other. The discharge cells produce a discharge and emit light, thereby displaying an image.

The structure of panel 10 is not limited to the above-mentioned structure, but may have, for example, stripe-shaped barrier ribs. The mixing ratio of the discharging gases is not limited to the above-mentioned ratio, but may be any other ratio.

Figure 2:
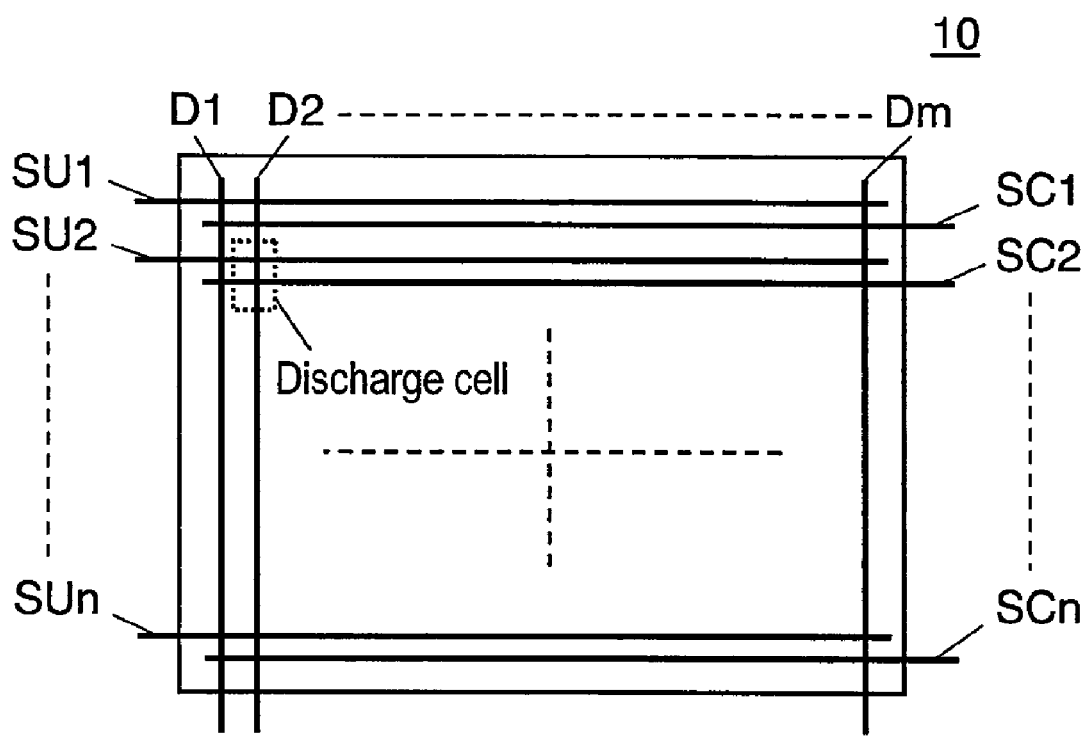
FIG. 2 is a diagram illustrating an arrangement of electrodes of the panel according to the first and second embodiments of the invention.

FIG. 2 is a diagram illustrating an arrangement of electrodes of panel 10 according to the first embodiment of the invention. In panel 10, n scan electrodes SC1 to SCn (scan electrodes 22 in FIG. 1) and n sustain electrodes SU1 to SUn (sustain electrodes 23 in FIG. 1) which are longitudinal in the row direction are arranged and m data electrodes D1 to Dm (data electrodes 32 in FIG. 1) which are longitudinal in the column direction are arranged. A discharge cell is formed at a position where a pair of scan electrode $SCi$ ($i=1\sim n$) and sustain electrode $SUi$ and one data electrode $Dj$ ($j=1\sim m$) intersect each other and $m\times n$ discharge cells are formed in the discharge space in total. As shown in FIGS. 1 and 2, since scan electrode $SCi$ and sustain electrode $SUi$ are parallel to form a pair, large inter-electrode capacitors Cp exist between scan electrodes SC1 to SCn and sustain electrodes SU1 to SUn.

Driving voltage waveforms for driving the panel 10 and operations thereof will be described now. The plasma display device according to the first embodiment performs a gray-scale display by the use of a sub field method, that is, by dividing a field period into plural sub fields and controlling the emission and non-emission of light of the discharge cells by sub fields. Each sub field has an initializing period, an address period, and a sustain period.

In the initializing period of each sub field, an initializing discharge is generated and wall charges required for a subsequent address discharge are formed on the electrodes. In addition, prime particles (priming for discharge=excited particles) for reducing the discharge delay and stably generating the address discharge are generated. The initializing operation includes an all-cell initializing operation of generating the initializing discharge in the overall discharge cells and a selection initializing operation of generating the initializing discharge in the discharge cells having generated the sustain discharge in the previous sub field.

In the address period, the address discharge is selectively generated in the discharge cells which should emit light in the subsequent sustain period, thereby forming wall charges. In the sustain period, sustain pulses of the number in proportion to a brightness weight are alternately applied to display electrode pairs 24 and the sustain discharge is generated in the discharge cells having generated the address discharge to emit light. Here, the proportional coefficient is called "brightness magnification."

In the first embodiment, a field includes 10 sub fields (first SF, second SF, ..., tenth SF) and the sub fields have brightness weights of, for example, 1, 2, 3, 6, 11, 18, 30, 44, 60, and 80. The all-cell initializing operation is performed in the initializing period of the first SF and the selection initializing operation is performed in the initializing periods of the second SF to the tenth SF. In the sustain periods of the sub fields, the sustain pulses corresponding to the number obtained by multiplying the brightness weights of the sub fields by a predetermined brightness magnification are applied to display electrode pairs 24.

However, in the first embodiment, the number of sub fields or the brightness weights of the sub fields are not limited to the above-mentioned values, but the configuration of the sub fields may be changed based on the image signals or the like.

Figure 3:
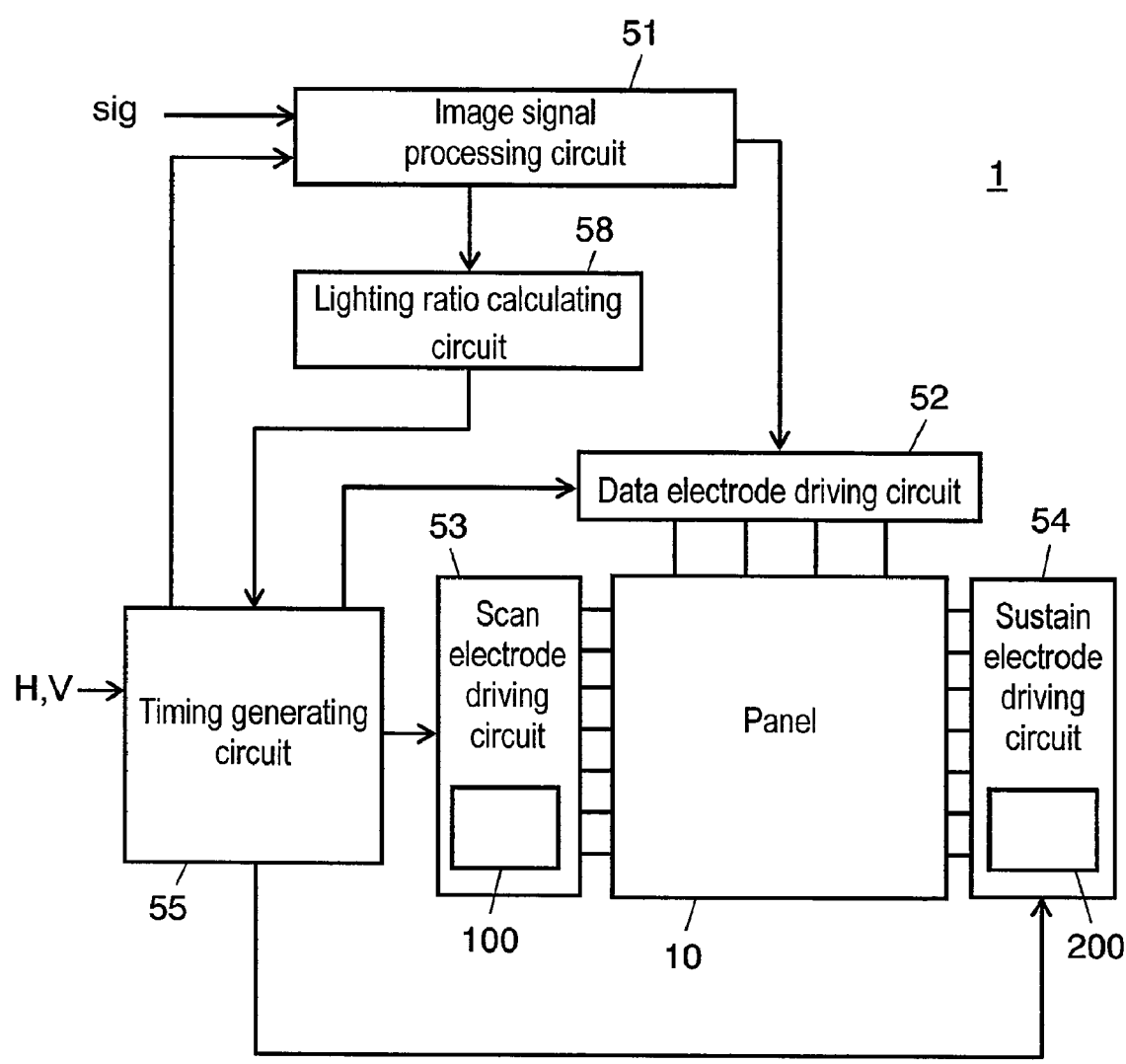
FIG. 3 is a circuit block diagram illustrating a plasma display device employing the panel according to the first embodiment of the invention.

FIG. 3 is a circuit block diagram illustrating the plasma display device employing the panel according to the first embodiment of the invention. Plasma display device 1 includes panel 10, image signal processing circuit 51, data electrode driving circuit 52, scan electrode driving circuit 53, sustain electrode driving circuit 54, timing generating circuit 55, lighting ratio calculating circuit 58, and power supply circuit (not shown).

Image signal processing circuit 51 converts an image signal sig into image data of each sub field. Data electrode driving circuit 52 converts the image data of each sub field into signals corresponding to data electrodes D1 to Dm to drive data electrodes D1 to Dm. Lighting ratio calculating circuit 58 calculates a lighting ratio of the discharge cells every sub field, that is, a ratio of the number of lighting discharge cells to the total discharge cells (hereinafter, simply referred to "lighting ratio"), based on the image data of each sub field. Timing generating circuit 55 generate various timing signals based on horizontal synchronization signal H, vertical synchronization signal V, and the lighting ratio calculated by lighting ratio calculating circuit 58 and supplies the timing signals to the circuit blocks. Scan electrode driving circuit 53 supplies a driving voltage waveform to scan electrodes SC1 to SCn based on the timing signal and sustain electrode driving circuit 54 supplies a sustain voltage waveform sustain electrodes SU1 to SUn based on the timing signal. Here, scan electrode driving circuit 53 includes sustain pulse generating circuit 100 for generating a sustain pulse to be described later and sustain electrode driving circuit 54 also includes sustain pulse generating circuit 200.

Next, driving voltage waveforms for driving the panel and operations thereof will be described.

Figure 4:
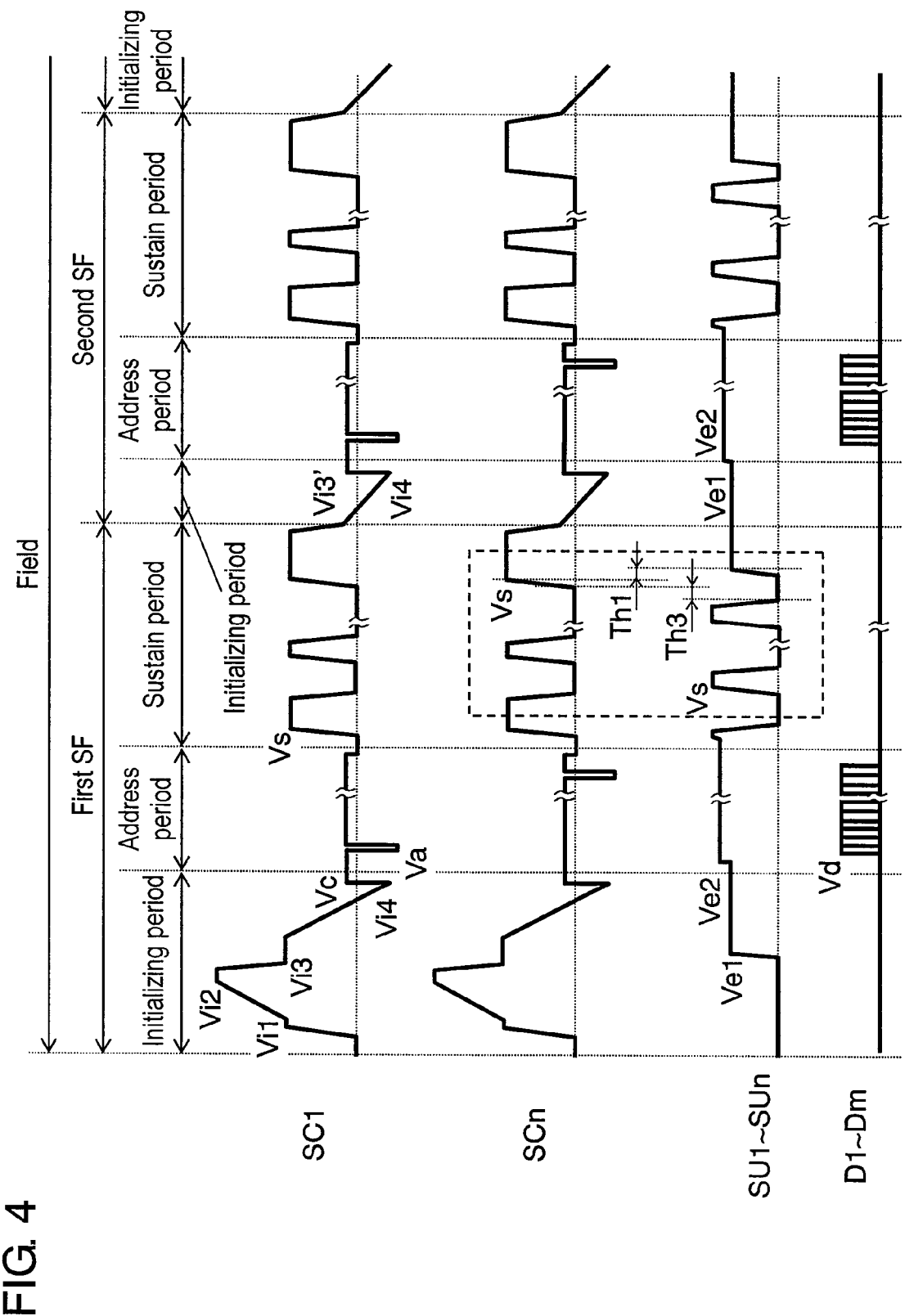
FIG. 4 is a diagram illustrating driving voltage waveforms applied to the electrodes of the panel according to the first embodiment of the invention.

FIG. 4 is a diagram illustrating the driving voltage waveforms applied to the electrodes of the panel according to the first embodiment of the invention. A field is divided into plural sub fields and each sub field includes an initializing period, an address period, and a sustain period. In the first embodiment, a field is divided into 10 sub fields (first SF, second SF, ..., tenth SF) for driving.

In the first half of the initializing period of the first SF, data electrodes D1 to Dm and sustain electrodes SU1 to SUn are kept at 0 V and an ramp waveform voltage (hereinafter, referred to as "ramp voltage") slowly rising from voltage Vi1, which is equal to or smaller than the breakdown start voltage, to voltage Vi2 which is greater than the breakdown start voltage is applied to scan electrodes SC1 to SCn. Then, a weak initializing discharge is generated in all the discharge cells, negative wall voltages are accumulated on scan electrodes SC1 to SCn, and positive wall voltages are accumulated on sustain electrodes SU1 to SUn and data electrodes D1 to Dm. Here, the wall voltages on the electrodes means voltages resulting from the wall charges accumulated on the dielectric layers or the phosphor layers covering the electrodes.

Subsequently, in the second half of the initializing period, sustain electrodes SU1 to SUn are kept at positive voltage Ve1 and a ramp voltage slowly falling from voltage Vi3 to voltage Vi4 is applied to scan electrodes SC1 to SCn. Then, a weak initializing discharge is generated in the overall discharge cells and thus the wall voltage between scan electrodes SC1 to SCn and sustain electrodes SU1 to SUn is weakened, whereby the positive wall voltage on data electrodes D1 to Dm are adjusted to a value suitable for the address operation.

In this way, in the first embodiment, the initializing operation of the first SF is the all-cell initializing operation of generating the initializing discharge in the overall discharge cells.

In the subsequent address period, sustain electrodes SU1 to SUn are kept at voltage Ve2 and scan electrodes SC1 to SCn are kept at voltage Vc. Next, negative scan pulse voltage Va is applied to first scan electrode SC1 and positive address pulse voltage Vd is applied to data electrodes Dk (k=1~m) of the discharge cells which should be lighted in the first row among data electrodes D1 to Dm. At this time, a voltage of an intersection between data electrode Dk and scan electrode Sc1 becomes a voltage obtained by adding the wall voltage of data electrode Dk and the wall voltage of scan electrode SC1 to externally applied voltage (Vd−Va), and exceeds the breakdown start voltage. The address discharge is generated between data electrode Dk and scan electrode SC1 and between sustain electrode SU1 and scan electrode SC1, a positive wall voltage is accumulated on scan electrode SC1 of the discharge cell, a negative wall voltage is accumulated on sustain electrode SU1, and a negative wall voltage is accumulated on data electrode Dk. In this way, the address operation of causing the address discharge in the discharge cells which should emit light in the first row and accumulating wall voltages on the electrodes is performed. On the other hand, since voltages of intersections between data electrodes D1 to Dm not supplied with address pulse voltage Vd and scan electrode SC1 do not exceed the breakdown start voltage, the address discharge is not generated. By sequentially performing the address operation up to the n-th row discharge cells, the address period is finished.

In the subsequent sustain period, a power recovery circuit is used to reduce power consumption. Details of the driving voltage waveforms are described later and the summary of the sustain operation in the sustain period is described. First, positive sustain pulse voltage Vs is applied to scan electrodes SC1 to SCn and a ground potential as a base potential, that is, 0 V, is applied to sustain electrodes SU1 to SUn. Then, in the discharge cells having generated the address discharge, the voltage between scan electrode SCi and sustain electrode SUi becomes a voltage obtained by adding the wall voltage of scan electrode SCi and the wall voltage of sustain electrode SUi to sustain pulse voltage Vs and thus exceeds the breakdown start voltage. The sustain discharge is generated between scan electrode SCi and sustain electrode SUi and phosphor layer 35 emits light due to the ultraviolet rays created at that time. A negative wall voltage is accumulated on scan electrode SCi and a positive wall voltage is accumulated on sustain electrode SUi. A positive wall voltage is accumulated on data electrode Dk. In the discharge cells not having generated the address discharge in the address period, the sustain discharge is not generated and the wall voltage at the end of the initializing period is maintained.

Subsequently, 0 V is applied to scan electrodes SC1 to SCn and sustain pulse voltage Vs is applied to sustain electrodes SU1 to SUn. Then, in the discharge cells having generated the sustain discharge, since the voltage between sustain electrode SUi and scan electrode SCi exceeds the breakdown start voltage, the sustain discharge is generated again between sustain electrode SUi and scan electrode SCi, whereby a negative wall voltage is accumulated on sustain electrode SUi and a positive wall voltage is accumulated on scan electrode SCi. Similarly, by alternately applying sustain pulse voltages of the number corresponding to the brightness weights to scan electrodes SC1 to SCn and sustain electrodes SU1 to SUn to cause a potential difference between the electrodes of the display electrode pairs, the sustain discharge is continuously generated in the discharge cells having generated the address discharge in the address period.

At the last of the sustain period, by applying a potential difference of a so-called narrow pulse shape between scan electrodes SC1 to SCn and sustain electrodes SU1 to SUn, all or a part of the wall voltage on scan electrode SCi and sustain electrode SUi are erased in a state where positive wall charges are left on data electrodes Dk. Specifically, sustain electrodes SUi to SUn are returned to 0 V, a period (hereinafter, referred to as "ground period Th3") in which sustain electrodes SUi to SUn and scan electrodes SC1 to SCn are kept at 0 V is then provided, and then sustain pulse voltage Vs is applied to scan electrodes SC1 to SCn. Then, in the discharge cells having generated the sustain discharge, the sustain discharge is generated between sustain electrode SUi and scan electrode SCi. Before the discharge converges, that is, while charge particles created due to the discharge sufficiently remain in the discharge space, voltage Ve1 is applied to sustain electrodes SU1 to SUn. Accordingly, the potential difference between sustain electrode SUi and scan electrode SCi is weakened to (Vs−Ve1). Then, in a state where positive wall charges are left on data electrode Dk, the wall voltage between scan electrodes SC1 to SCn and sustain electrodes SU1 to SUn is weakened to the difference (Vs−Ve1) between voltages applied to the electrodes. Hereinafter, this discharge is referred to as "erasing discharge". The potential difference applied between the display electrode pairs, that is, between scan electrodes SC1 to SCn and sustain electrodes SU1 to SUn, to generate the erasing discharge has a narrow pulse shape having a small width.

In this way, in a predetermined time interval (hereinafter, referred to as "erasing phase difference Th1") after voltage Vs for generating the final sustain discharge, that is, the erasing discharge, is applied to scan electrodes SC1 to SCn, voltage Ve1 for reducing the potential difference between the electrodes of the display electrode pairs to sustain electrodes SU1 to SUn. In this way, the sustain operation in the sustain period of the first SF is finished.

In the initializing period of the second SF, sustain electrodes SU1 to SUn is kept at voltage Ve1, data electrodes D1 to Dm are kept at 0 V, a ramp voltage slowly falling from voltage Vi3' to voltage Vi4 is applied to scan electrodes SC1 to SCn. Then, in the discharge cells having generating the sustain discharge in the sustain period of the previous sub field, a weak initializing discharge is generated and the wall voltages of scan electrode SCi and sustain electrode SUi are weakened. In data electrode Dk, since the positive wall voltage is sufficiently accumulated on data electrode Dk in the previous sustain period, the excessive wall voltage is discharged and thus the wall voltage is adjusted to be suitable for the address operation. On the other hand, in the discharge cells not having generated the sustain discharge in the previous sub field, the wall charges at the end of the initializing period of the previous sub field are maintained without being discharged.

In this way, the initializing operation of the second SF is a selection initializing operation of selectively causing the initializing operation in the discharge cells having generated the sustain operation in the sustain period of the previous sub field.

The operation of the address period of the second SF is equal to that of the first SF and thus its description is omitted. The operation of the subsequent sustain period is equal to that of the sustain period of the first SF, except for the number of sustain pulses. The operations of the initializing periods of the third SF to the tenth SF are the same selection initializing operation as the second SF and the address operations of the address periods are equal to that of the second SF.

Here, in the first embodiment, erasing phase difference Th1 of a voltage applied to the display electrode pairs at the final sustain discharge of the sustain period and ground period Th3 in which the display electrode pairs are maintained at a ground potential just before the erasing phase difference are controlled in accordance with the lighting ratio of each sub field.

FIG. 5 is a diagram illustrating a relation between the lighting ratio and erasing phase difference Th1 and a relation between the lighting ratio and ground period Th3 in the first embodiment. As shown in FIG. 5, erasing phase difference Th1 and ground period Th3 are changed depending on the lighting ratio. When the lighting ratio is less than 44%, erasing phase difference Th1 is set to 150 nsec and ground period Th3 is set to 0 nsec. When the lighting ratio is 44% or more, erasing phase difference Th1 is set to 300 nsec and ground period Th3 is set to 500 nsec. In this way, in the first embodiment, erasing phase difference Th1 and ground period Th3 are changed depending on the lighting ratio.

Details of the operation in the sustain period will be described now. First, details of sustain pulse generating circuits 100 and 200 which are a driving circuit for alternately applying a sustain pulse to the display electrode pairs and allowing the discharge cells to generate the sustain discharge will be described.

Figure 6:
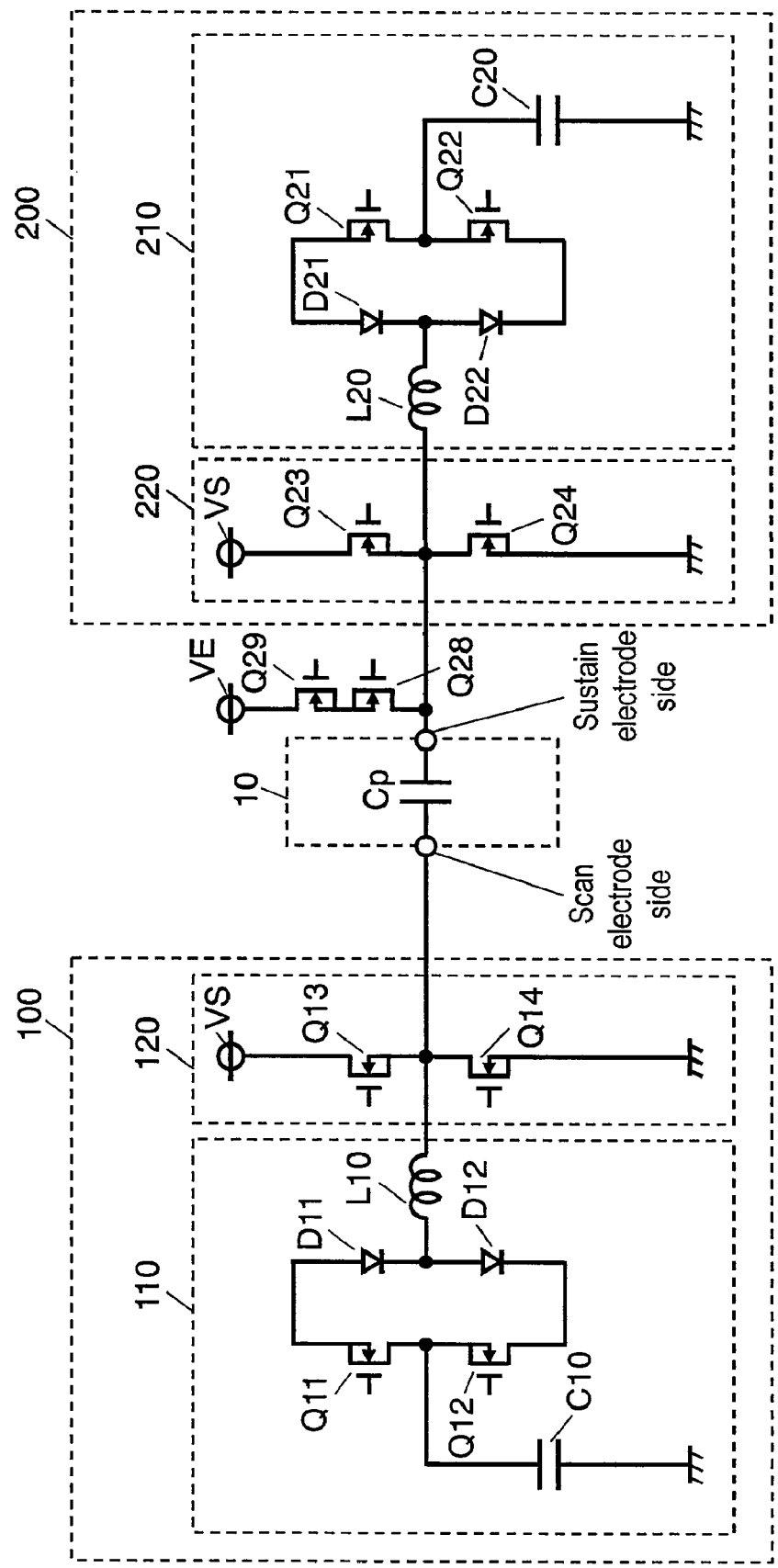
FIG. 6 is a circuit diagram illustrating a sustain pulse generating circuit of the plasma display device according to the first embodiment of the invention.

FIG. 6 is a circuit diagram of sustain pulse generating circuits 100 and 200 of the plasma display device according to the first embodiment of the invention. Sustain pulse generating circuit 100 includes power recovery section 110 and clamp section 120. Power recovery section 110 includes power recovery capacitor C10, switching elements Q11 and Q12, reverse-current preventing diodes D11 and D12, and power recovery inductor L10. Clamp section 120 includes power source VS of which a voltage value is Vs, switching elements Q13 for clamping scan electrodes 22 to power source VS, and switching element Q14 for clamping scan electrodes 22 to the ground potential. Power recovery section 110 and clamp section 120 are connected to scan electrodes 22 which are ends of inter-electrode capacitors Cp of panel 10 through the scan pulse generating circuit. The scan pulse generating circuit is not shown in FIG. 6. Capacitor C10 has a sufficiently greater capacitance than that of inter-electrode capacitors Cp, the voltage value thereof is charged with almost Vs/2, and the capacitor servers as a power source of power recovery section 110.

Sustain pulse generating circuit 200 has the same circuit structure as sustain pulse generating circuit 100 and includes power recovery section 210 that has power recovery capacitor C20, switching elements Q21 and Q22, reverse-current preventing diodes D21 and D22, and power recovery inductor L20 and clamp section 220 which has power source VS, switching elements Q23 for clamping sustain electrodes 23 to power source VS, and switching element Q24 for clamping sustain electrodes 23 to the ground potential. The output of sustain pulse generating circuit 200 is connected to sustain electrodes 23 which are the other ends of inter-electrode capacitors Cp of panel 10. For the purpose of later description, FIG. 6 shows power source VE of voltage Ve1 and switching elements Q28 and Q29 for applying to sustain electrodes 23 voltage Ve1 for reducing the potential difference between the display electrode pairs.

Next, details of the driving voltage waveforms will be described.

Figure 7:
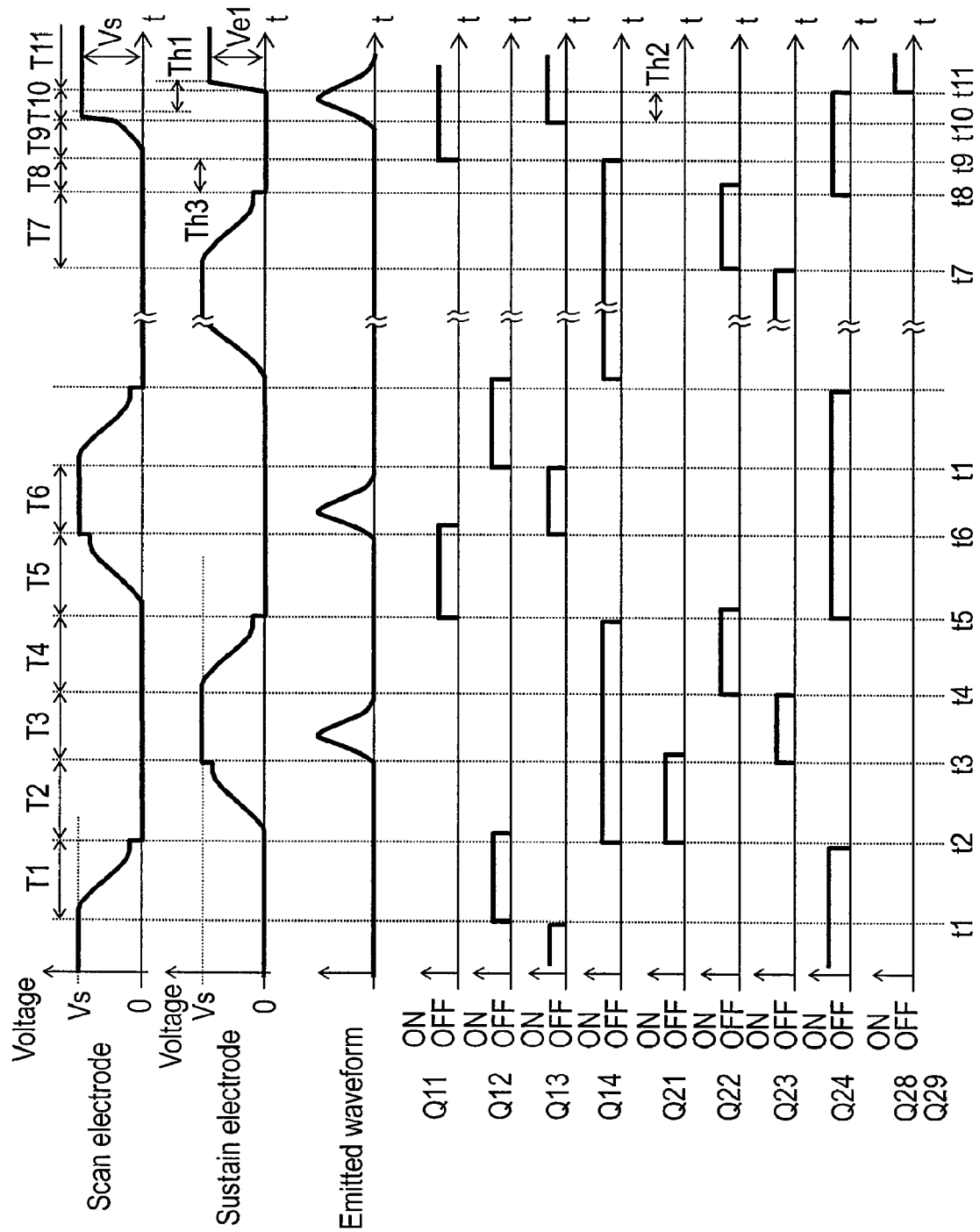
FIG. 7 is a timing diagram illustrating operations of the sustain pulse generating circuit of the plasma display device according to the first embodiment of the invention.

FIG. 7 is a timing diagram illustrating operations of sustain pulse generating circuits 100 and 200 of the plasma display device according to the first embodiment of the invention and shows details of the portion surrounded by a dotted line in FIG. 4. First, one period of a sustain pulse is divided into six periods of T1 to T6 and then the respective periods will be described.

(Period T1)

At time t1, switching element Q12 is turned on (hereinafter, turning on a switching element is referred to "ON" and turning off a switching element is referred to "OFF"). Then, charges close to scan electrodes 22 starts flowing to capacitor C10 through inductor L10, diode D12, and switching element Q12 and thus the voltage of scan electrodes 22 starts falling down. Since inductor L10 and inter-electrode capacitor Cp form a resonance circuit, the voltage of scan electrodes 22 at time t2 after ½ of the resonance period passes goes down to the vicinity of 0 V. However, the voltage of scan electrodes 22 does not go down to 0 V due to the power loss resulting from a resistive component of the resonance circuit. In the meanwhile, switching element Q24 is kept in the OFF state.

(Period T2)

At time t2, switching element Q14 is turned on. Since scan electrodes 22 is connected directly to the ground through switching element Q14, the voltage of scan electrodes 22 forcibly goes down to 0 V.

At time t2, switching element Q21 is turned on. Then, current starts flowing from power recovery capacitor C20 through switching element Q21, diode D21, and inductor L20 and the voltage of sustain electrodes 23 starts going up. Since inductor L20 and inter-electrode capacitor Cp form a resonance circuit, the voltage of sustain electrodes 23 at time t3 after ½ of the resonance period passes goes up to the vicinity of Vs. However, the voltage of sustain electrodes 23 does not go up to Vs due to the power loss resulting from the resistive component of the resonance circuit.

(Period T3)

At time t3, switching element Q23 is turned on. Then, since sustain electrodes 23 are connected directly to power source VS through switching element Q23, the voltage of sustain electrodes 23 forcibly goes up to Vs. Then, in the discharge cells having generated the address discharge, the voltage between scan electrode 22 and sustain electrode 23 exceeds the breakdown start voltage and thus the sustain discharge is generated.

(Periods T4 to T6)

Since the sustain pulse applied to scan electrodes 22 and the sustain pulse applied to sustain electrodes 23 have the same waveform, the operations of periods T4 to T6 are equivalent to the operations of period T1 to T3, except that scan electrodes 22 and sustain electrodes 23 are replaced with each other, and thus its description is omitted.

Switching element Q12 is turned off from time t2 to time t5 and switching element Q21 is turned off from time t3 to time t4. Switching element Q22 is turned off from time t5 to time t2 and switching element Q11 is turned off from t6 to time t1. In order to decrease the output impedance of scan pulse generating circuits 100 and 200, it is preferable that switching element Q24 is turned off just before time t2 and switching element Q13 is turned off just before time t1. It is also preferable that switching element Q14 is turned off just before time t5 and switching element Q23 is turned off just before time t4.

The operations of periods T1 to T6 are repeated depending on the necessary number of pulses. In the first embodiment, the resonance period is set to about 1200 nsec and the time from time t1 to time t2, that is, the time of period T1, is set to 550 nsec. The times of periods T2, T4, and T5 are set to 550 nsec, similarly to period T1. The times of periods T3 and T6 are set to 1450 nsec.

Next, the final erasing discharge in the sustain period will be described in detail into five periods of T7 to T11.

(Period T7)

This period is equal to period T4, in which the sustain pulse applied to sustain electrodes 23 goes down. That is, by turning off switching element Q23 just before time t7 and turning on switching element Q22 at time t7, the charges close to sustain electrodes 23 start flowing to capacitor C20 through inductor L20, diode D22, and switching element Q22 and the voltage of sustain electrodes 23 starts going down.

(Period T8)

By turning on switching element Q24 at time t8, the voltage of sustain electrodes 23 is forcibly made to go down to 0 V. Since switching element Q14 is kept on from period T7 and thus the voltage of scan electrodes 22 is kept at 0 V, display electrode pairs, that is, scan electrodes 22 and sustain electrodes 23, are connected to ground voltage 0 V in period T8.

(Period T9)

By turning off switching element Q14 just before time t9 and turning on switching element Q11 at time t9, current starts flowing from power recovery capacitor C10 through switching element Q11, diode D11, and inductor L10 and the voltage of scan electrodes 22 starts going up.

(Period T10)

Since inductor L10 and inter-electrode capacitor Cp form a resonance circuit, the voltage of scan electrodes 22 goes up to the vicinity of Vs after ½ of the resonance period passes. However, in this case, switching element Q13 is turned on in a period shorter than ½ of the resonance period of the power recovery section, that is, at time t10 before the voltage of scan electrodes 22 goes up to the vicinity of Vs. Then, since scan electrodes 22 are connected directly to power source Vs through switching element Q13, the voltage of scan electrodes 22 goes up to Vs rapidly. In the discharge cells having generated the address discharge, the voltage between scan electrode 22 and sustain electrode 23 exceeds the breakdown start voltage, thereby generating the sustain discharge.

(Period T11)

Switching element Q24 is turned off just before time t11 and switching element Q28 and switching element Q29 are turned on at time t11. Then, since sustain electrodes 23 are connected directly to erasing power source VE through switching elements Q28 and Q29, the voltage of sustain electrodes 23 is forcibly made to go up to Ve1. Time t11 is a time before the discharge generated in period T10 converges, that is, a time when charged particles generated by the discharge are sufficiently left in the discharge space. Since the electric field in the discharge space is changed while the charged particles are sufficiently left in the discharge space, the charged particles are re-arranged so as to reduce the changed electric field, thereby forming wall charges. At this time, since a difference between voltage Vs applied to scan electrodes 22 and voltage Ve1 applied to sustain electrodes 23 is small, the wall voltages on scan electrodes 22 and sustain electrodes 23 are weakened. In this way, the potential difference for generating the final sustain discharge is a potential difference of a narrow pulse shape adjusted so as to reduce the potential difference applied across the display electrode pairs before the final sustain discharge converges, and the generated sustain discharge is an erasing discharge. Since data electrodes 32 are kept at 0 V and the charged particles form wall charges so as to reduce a potential difference between the voltage applied to data electrodes 32 and the voltage applied to scan electrodes 22, a positive wall voltage is formed on data electrodes 32.

Here, erasing phase difference Th1 is a time interval after voltage Vs for generating the erasing discharge is applied to scan electrodes 22 until voltage Ve1 for reducing the potential difference between electrodes of the display electrode pairs is applied to sustain electrodes 23. However, the control thereof is performed by the use of the switching elements in the first embodiment. That is, switching element Q13 for applying voltage Vs for generating a sustain discharge to scan electrodes 22 and switching elements Q28 and Q29 for applying voltage Ve1 for reducing the potential difference between electrodes of the display electrode pairs to sustain electrodes 23 are provided. First, switching element Q13 is turned on, a time interval (hereinafter, referred to as "erasing phase difference Th2") corresponding to the lighting ratio of the discharge cells in the sub field is provided, and then switching elements Q28 and Q29 are turned on. At this time, erasing phase difference Th1 and erasing phase difference Th2 may not be strictly equal to each other, but can be considered as being equal to each other in practice as long as the delay times of the switching elements are not greatly different from each other. Accordingly, erasing phase difference Th1 is simply referred to as erasing phase difference Th.

The time period from time t10 to time t11, that is, period T10, means erasing phase difference Th and is controlled by the use of the lighting ratio of the sub field as shown in FIGS. 5 and 7. That is, erasing phase difference Th is controlled to be 150 nsec when the lighting ratio is less than 44% and to be 300 nsec when the light ratio is 44% or more. The time period from time t8 to time t9, that is, period T8, means ground period Th3 and is controlled by the use of the lighting ratio of the sub field as shown in FIGS. 5 and 7. That is, ground period Th3 is controlled to be 0 nsec when the lighting ratio is less than 44% and to be 500 nsec when the light ratio is 44% or more.

In this way, in the first embodiment, in erasing phase difference Th after the voltage for generating the erasing discharge as the final sustain discharge is applied to the display electrode pairs, a voltage is applied to the display electrode pairs so as to reduce the potential difference between electrodes of the display electrode pairs. The potential difference for generating the erasing discharge is a narrow pulse shape voltage obtained by changing the potential difference between electrodes of the display electrode pairs before the final sustain discharge converges. Erasing phase difference Th is controlled as shown in FIGS. 5 and 7 so that erasing phase difference Th when the lighting ratio of the discharge cells is high is longer than erasing phase difference Th when the lighting ratio of the discharge cells is low. In this way, it is possible to generate a stable address discharge without increasing scan pulse voltage Va or data pulse voltage.

In the first embodiment, in the sustain period of the sub field having a high lighting ratio, until the final sustain pulse is applied after the sustain pulse just before the final sustain pulse is applied, ground period Th3 (period T8) for keeping the display electrode pairs at 0 V. Accordingly, it is possible to reduce the crosstalk.

Next, by applying a voltage to the display electrode pairs so as to reduce the potential difference between electrodes of the display electrode pairs after erasing phase difference Th passes, the reason for being capable of generating a stable address discharge without increasing scan pulse voltage Va or data pulse voltage will be described.

As described above, the narrow-pulse erasing discharge changes the electric field in the discharge space while the charged particles generated by the discharge are sufficiently left in the discharge space, and forms desired wall charges by rearranging the charged particles to reduce the changed electric field. Accordingly, when erasing phase difference Th is long, the charged particles generated by the discharge are recombined and the charged particles for reducing the electric field are insufficient, thereby not forming desired wall charges. As a result, it was seen that the address failure (hereinafter, referred to as "first type of address failure") that the address discharge is not generated in the discharge cells to emit light increases.

Figure 8A:
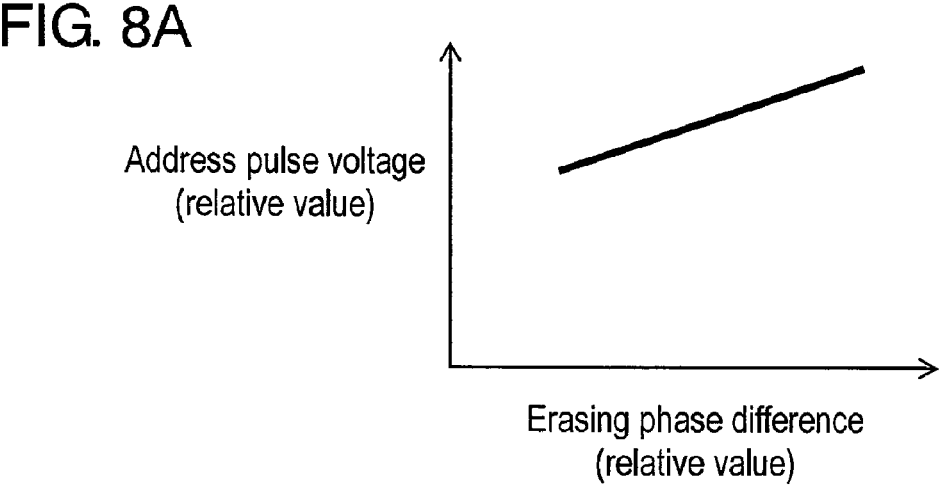
FIG. 8A is a diagram schematically illustrating a relation between an address pulse voltage for generating a normal address discharge and the erasing phase difference.

FIG. 8A is a diagram schematically illustrating a relation between the address pulse voltage for generating a normal address discharge and erasing phase difference Th. The horizontal axis represents erasing phase difference Th and the vertical axis represents the address pulse voltage for generating the normal address discharge. As shown in FIG. 8A, it was found from experiments that the address pulse voltage for allowing the desired discharge cells to surely generate the address discharge increases as erasing phase difference Th is extended.

On the other hand, it was found out from experiments that scan pulse voltage Va for generating the normal address discharge increases when the erasing phase difference Th is too small. The magnitude of scan pulse voltage Va is a voltage for distinguishing the discharge cells in the selected row and the discharge cells in the non-selected rows from each other. Actually, when scan pulse voltage Va is reduced, the wall charges of the discharge cells in the non-selected row are taken away while the discharge cells in any one row generate the address discharge. Accordingly, when it is intended to generate the address discharge, the address failure (hereinafter, referred to as "second type of address failure") is caused that the wall charges is insufficient and the address discharge is not generated.

Figure 8B:
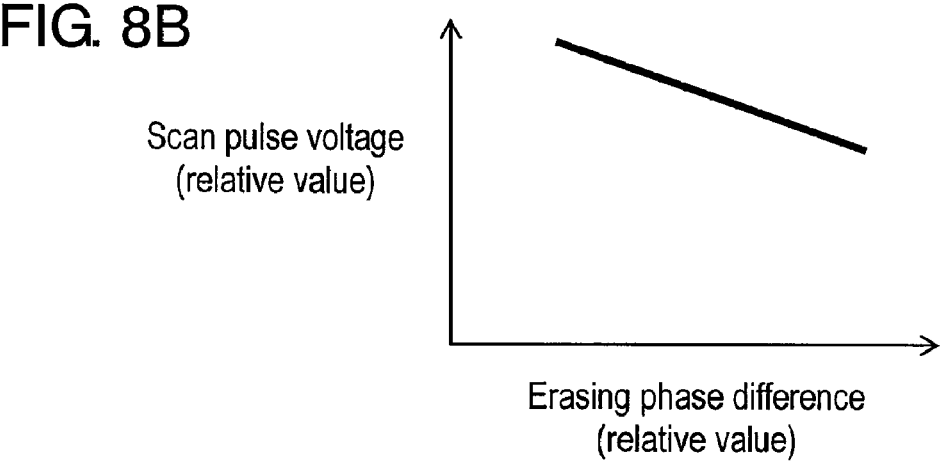
FIG. 8B is a diagram schematically illustrating a relation between a scan pulse voltage for generating a normal address discharge and the erasing phase difference.

FIG. 8B is a diagram schematically illustrating a relation between scan pulse voltage Va for generating the normal address discharge and erasing phase difference Th. The horizontal axis represents erasing phase different Th and the vertical axis represents scan pulse voltage Va for generating the normal address discharge. As shown in the figure, it was found from experiments that scan pulse voltage Va for generating the normal address discharge becomes greater as erasing phase difference Th becomes smaller. When scan pulse voltage Va for generating the normal address discharge increases, the second type of address failure can be easily caused. Accordingly, scan pulse voltage Va should be increased so as to prevent the second type of address failure. In this way, since the first type of address failure and the second address failure have the opposite characteristics with respect to erasing phase difference Th, it is preferable that erasing phase difference Th should be set to such a value not to cause any address failure.

As the result of further studies, it was found that the optimal erasing phase different Th becomes longer as the lighting ratio in the sub field becomes higher.

Figure 8C:
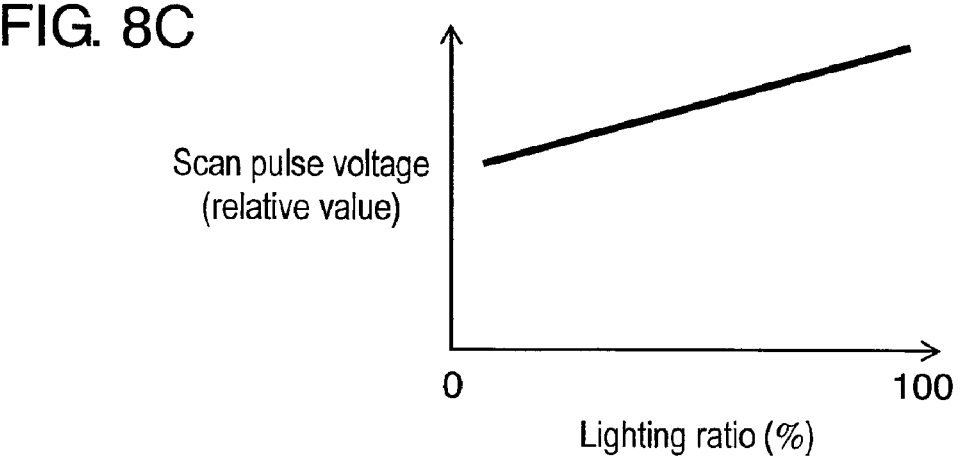
FIG. 8C is a diagram schematically illustrating a relation between the scan pulse voltage for generating a normal address discharge and the lighting ratio.

FIG. 8C is a diagram schematically illustrating a relation between scan pulse voltage Va for generating the normal address discharge and the lighting ratio. The horizontal axis represents the lighting ratio and the vertical axis represents scan pulse voltage Va for generating the normal address discharge. As shown in the figure, when the lighting ratio increases, scan pulse voltage Va for generating the normal address discharge increases. Accordingly, when the lighting ratio increases but scan pulse voltage Va is constant, the generation of the address discharge is delayed. When the lighting ratio increases, this can be considered that the discharge current increases, the voltage drop increases accordingly, the effective voltage applied to the discharge cells decreases, and scan pulse voltage Va for generating the normal address discharge increases. Accordingly, when scan pulse voltage Va is constant, it can be considered that the effective voltage applied to the discharge cells decreases and the generation of the address discharge is delayed.

When the address discharge is delayed, such a discharge is the same that the width of narrow potential difference for generating the erasing discharge is equivalently reduced, that is, erasing phase difference Th is shortened.

Figure 9:
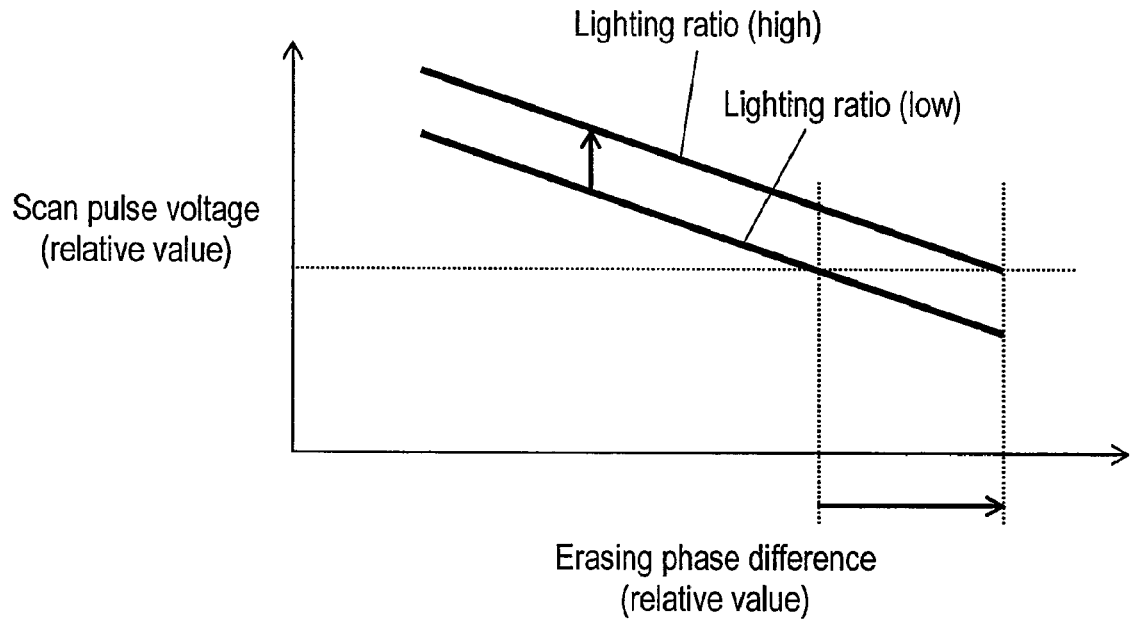
FIG. 9 is a diagram schematically illustrating a relation among the scan pulse voltage for generating a normal address discharge, the erasing phase difference, and the lighting ratio.

FIG. 9 is a diagram schematically illustrating a relation among scan pulse voltage Va for generating the normal address discharge, erasing phase difference Th, and the lighting ratio. As shown in FIG. 9, scan pulse voltage Va for generating the normal address discharge increases as erasing phase difference Th decreases and scan pulse voltage Va for generating the normal address discharge increases as the lighting ratio increases. Accordingly, in the sub field having a high lighting ratio, the optimal erasing phase difference Th is greater than that of the sub field having a low lighting ratio.

Accordingly, in the first embodiment, when the lighting ratio is low, the erasing phase difference Th is controlled to the above-mentioned predetermined value. As the lighting ratio increases, erasing phase difference Th should be made to increase, thereby setting the actual width of the narrow pulse to be proper. Accordingly, it is possible to always maintain erasing phase difference Th in a proper value without depending on the lighting ratio, thereby performing a proper driving operation.

In the first embodiment, by disposing ground period Th3 between the final sustain pulse and the previous sustain pulse, the occurrence of a crosstalk is reduced.

In general, when sustain pulse voltage Vs increases out of a proper voltage range, a crosstalk occurs. This is because when sustain pulse voltage Vs is higher than the proper voltage range, the sustain discharge is strongly generated and thus affects the adjacent discharge cells, thereby causing a discharge in the discharge cells not having generated the address discharge due to the influence from the adjacent discharge cells.

Therefore, the inventor made an experiment on the proper range of sustain pulse voltage for suppressing the crosstalk. In this experiment, when ground period Th3 is provided and the time of ground period Th3 is changed, it was observed how sustain pulse voltage Vs for generating the normal sustain discharge would be changed. The experiment results are shown in FIG. 10.

Figure 10:
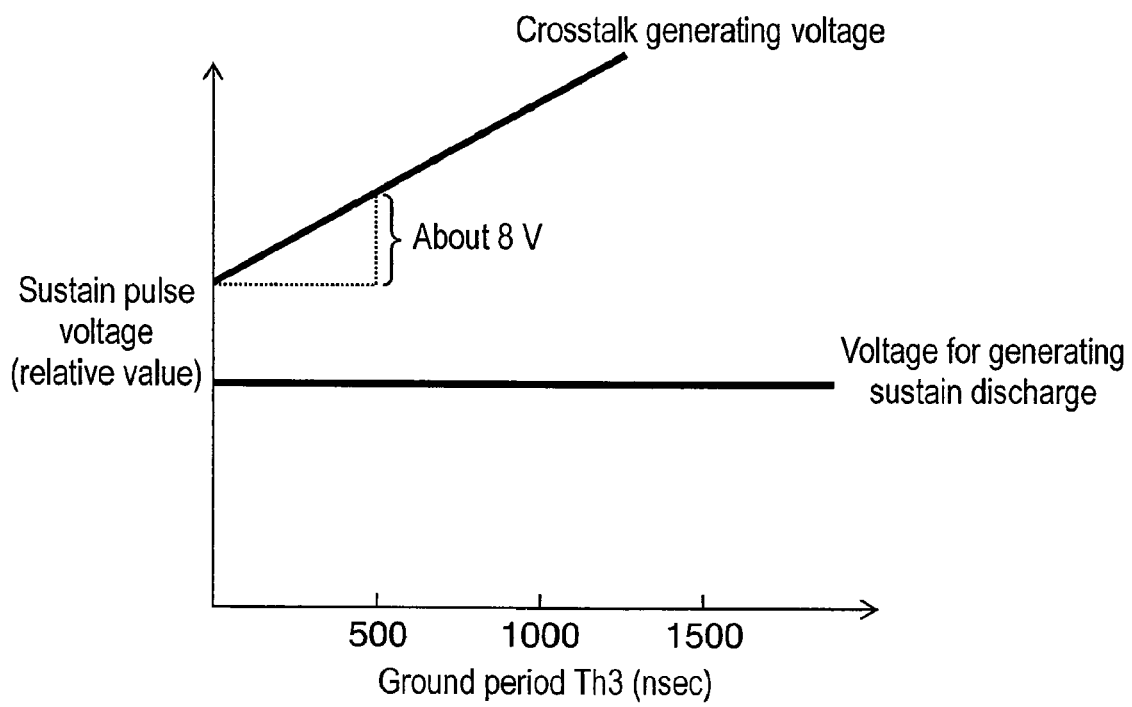
FIG. 10 is a diagram schematically illustrating a relation between the scan pulse voltage for generating a normal sustain discharge and the ground period.

FIG. 10 is a diagram schematically illustrating a relation between sustain pulse voltage Vs for generating the normal sustain discharge and ground period Th3. The horizontal axis represents ground period Th3 and the vertical axis represents sustain pulse voltage Vs for generating the normal sustain discharge. In this experiment, the inventor inspected sustain pulse voltage Vs for generating the normal sustain discharge and the lower limit (shown in "crosstalk generating voltage" in FIG. 10) of sustain pulse voltage Vs at which the crosstalk occurs.

As a result, the followings were clear. As shown in FIG. 10, it was apparent that sustain pulse voltage Vs for generating the normal sustain discharge is hardly affected by ground period Th3 and is constant. On the other hand, the crosstalk generating voltage increases by extending ground period Th3. Then, it was found that a difference between sustain pulse voltage Vs for generating the normal sustain discharge and the crosstalk generating voltage is enhanced by increasing ground period Th3. When the crosstalk generating voltage increases, the crosstalk occurs more difficultly by the increase in crosstalk generating voltage in comparison with a case of sustain pulse voltage Vs for generating the normal sustain discharge. This is because the occurrence of the crosstalk can be reduced by providing ground period Th3.

The followings were apparent. The crosstalk generating voltage when ground period Th is about 500 nsec is higher by about 8 V than the crosstalk generating voltage when ground period Th is 0 nsec, thereby obtaining a sufficient effect of reducing the crosstalk. Although not shown in FIG. 10, it was found that the effect of reducing the crosstalk is higher when the lighting ratio is high than when the lighting ratio is low. This is because when the lighting ratio is high, the ratio of the discharge cells generating the sustain discharge increases.

When setup period TH3 increases, the number of sustain pulses decreases, thereby making the multi gray-scale display difficult. Therefore, in order to suppress the extension of the sustain period to the minimum by providing ground period Th3 based on the experiment results, in the first embodiment, ground period Th3 of 500 nsec is provided only when the lighting ratio is 44% or more. Accordingly, it is possible to suppress the extension of the sustain period to the minimum, thereby obtaining a high effect of reducing the crosstalk.

As described above, in the first embodiment, erasing phase difference Th when the lighting ratio of the discharge cells is high is greater than erasing phase difference Th when the lighting ratio of the discharge cells is low. In this way, it is possible to embody the stable generation of the address discharge without increasing scan pulse voltage Va or data pulse voltage.

In the first embodiment, as described above, ground period Th3 is provided only when the lighting ratio is relatively high in the sub field having a relatively high brightness weight. Accordingly, it is possible to suppress the extension of the sustain period to the minimum, thereby obtaining a high effect of reducing the crosstalk.

The time values of period T1 to T10 described in the first embodiment are all examples. The invention is not limited to the values, but the time values may be set depending on the discharge characteristic of the panel.

Although it has been described in the first embodiment that the all-cell initializing operation is performed in the initializing period of the first SF and the selection initializing operation is performed in the initializing period of the second SF, the invention is not limited to it, but the all-cell initializing operation and the selection initializing operation may be arbitrarily performed in the sub fields.

Although it has been described in the first embodiment that one field is divided into 10 sub fields (first SF, second SF, . . . , tenth SF), the invention is not limited to the above-mentioned ones in the number of sub fields or in brightness weights of the sub fields.

Although it has been described in the first embodiment that erasing phase difference Th is set to 150 nsec when the lighting ratio is less than 44% and is set to 300 nsec when the lighting ratio is 44% or more and ground period Th3 is set to 0 nsec when the lighting ratio is less than 44% and is set to 500 nsec when the lighting ratio is 44% or more, the invention is limited to this example. For example, the lighting ratio may be changed to a proper value every sub field or erasing phase difference Th or ground period Th3 may be substantially continuously changed depending on the lighting ratio. In this control, since an influence of a variation in erasing phase difference Th or ground period Th3 on a display image is continuously changed, it is possible to improve image display quality.

One or both of erasing phase difference Th or ground period Th3 may be changed depending on the brightness weight of the sub field.

It has been described in the first embodiment that the base potential is the ground potential. However, in an AC panel, since the discharge cells are surrounded with the dielectric layer and the driving waveforms of the electrodes are capacitively applied to the discharge cells, the driving waveforms including the base potential may be shifted in level in a DC manner.

Second Embodiment

Next, a plasma display device according to a second embodiment of the invention will be described with reference to the drawings.

FIG. 1 is an exploded perspective view illustrating a part of panel 10 according to the second embodiment of the invention. Plural display electrode pairs 24 each having scan electrode 22 and sustain electrode 23 are formed on front glass substrate 21. Dielectric layer 25 is formed to cover scan electrodes 22 and sustain electrodes 23 and protective layer 26 is formed on dielectric layer 25.

In order to lower a breakdown start voltage in discharge cells, protective layer 26 is formed of a material containing as a major component MgO which has been used as a material of a panel and which has a high secondary electron emission coefficient and an excellent durability when neon (Ne) and xenon (Xe) gases enclosed therein.

Plural data electrodes 32 are formed on rear substrate 31. Dielectric layer 33 is formed to cover data electrodes 32 and barrier ribs 34 having a mesh shape are formed thereon. Phosphor layer 35 emitting light of red (R), green (G), and blue (B) are formed on the side surfaces of barrier ribs 34 and on the surfaces of dielectric layer 33.

Front substrate 21 and rear substrate 31 are disposed with a minute discharge space therebetween so that display electrode pairs 24 and data electrodes 32 intersect each other and the outer circumferential portions are sealed with a sealing material such as glass frit. A mixture gas of neon and xenon is enclosed as a discharge gas in the discharge space. In the second embodiment, the discharge gas having about 10% of xenon in partial pressure is used to improve the brightness. The discharge space is partitioned into plural regions by barrier ribs 34 and discharge cells are formed at positions where the display electrode pairs 24 and data electrodes 32 intersect each other. The discharge cells produce a discharge and emit light, thereby displaying an image.

The structure of panel 10 is not limited to the above-mentioned structure, but may have, for example, stripe-shaped barrier ribs. The mixing ratio of the discharging gases is not limited to the above-mentioned ratio, but may be any other ratio.

FIG. 2 is a diagram illustrating an arrangement of electrodes of panel 10 according to the second embodiment of the invention. In panel 10, n scan electrodes SC1 to SCn (scan electrodes 22 in FIG. 1) and n sustain electrodes SU1 to SUn (sustain electrodes 23 in FIG. 1) which are longitudinal in the row direction are arranged and m data electrodes D1 to Dm (data electrodes 32 in FIG. 1) which are longitudinal in the column direction are arranged. A discharge cell is formed at a position where a pair of scan electrode SCi (i=1~n) and sustain electrode SUi and one data electrode Dj (j=1~m) intersect each other and m×n discharge cells are formed in the discharge space in total. As shown in FIGS. 1 and 2, since scan electrode SCi and sustain electrode SUi are parallel to form a pair, large inter-electrode capacitors Cp exist between scan electrodes SC1 to SCn and sustain electrodes SU1 to SUn.

Driving voltage waveforms for driving the panel 10 and operations thereof will be described now. The plasma display device according to the second embodiment performs a gray-scale display by the use of a sub field method, that is, by dividing a field period into plural sub fields and controlling the emission and non-emission of light of the discharge cells by sub fields. Each sub field has an initializing period, an address period, and a sustain period.

In the initializing period of each sub field, an initializing discharge is generated and wall charges required for a subsequent address discharge are formed on the electrodes. In addition, prime particles (priming for discharge=excited particles) for reducing the discharge delay and stably generating the address discharge are generated. The initializing operation includes an all-cell initializing operation of generating the initializing discharge in the overall discharge cells and a selection initializing operation of generating the initializing discharge in the discharge cells having generated the sustain discharge in the previous sub field.

In the address period, the address discharge is selectively generated in the discharge cells which should emit light in the subsequent sustain period, thereby forming wall charges. In the sustain period, sustain pulses of the number in proportion to a brightness weight are alternately applied to display electrode pairs 24 and the sustain discharge is generated in the discharge cells having generated the address discharge to emit light. Here, the proportional coefficient is called "brightness magnification."

In the second embodiment, a field includes 10 sub fields (first SF, second SF, ..., tenth SF) and the sub fields have brightness weights of, for example, 1, 2, 3, 6, 11, 18, 30, 44, 60, and 80. The all-cell initializing operation is performed in the initializing period of the first SF and the selection initializing operation is performed in the initializing periods of the second SF to the tenth SF. In the sustain periods of the sub fields, the sustain pulses corresponding to the number obtained by multiplying the brightness weights of the sub fields by a predetermined brightness magnification are applied to display electrode pairs 24.

However, in the second embodiment, the number of sub fields or the brightness weights of the sub fields are not limited to the above-mentioned values, but the configuration of the sub fields may be changed based on the image signals or the like.

In the second embodiment, the generation time of an erasing discharge generated in the last of the sustain period is controlled based on the accumulated time of the time when panel 10 is electrified which is measured by an accumulated time measuring circuit to be described later. Specifically, when the accumulated electrification time of panel 10 exceeds a predetermined time, the timing for applying the final sustain pulse voltage in the sustain period is set to be later than that before it exceeds the predetermined time. Accordingly, it is possible to generate a stable address discharge in a high-brightness panel without increasing a voltage for generating the address discharge, regardless of an accumulated electrification time for the panel, thereby improving image display quality. First, the summary of driving voltage waveforms will be described and then a difference in driving voltage waveform between when the accumulated electrification time measured by the accumulated time measuring circuit is less than or equal to the predetermined time and when it exceeds the predetermined time will be then described.

Figure 11:
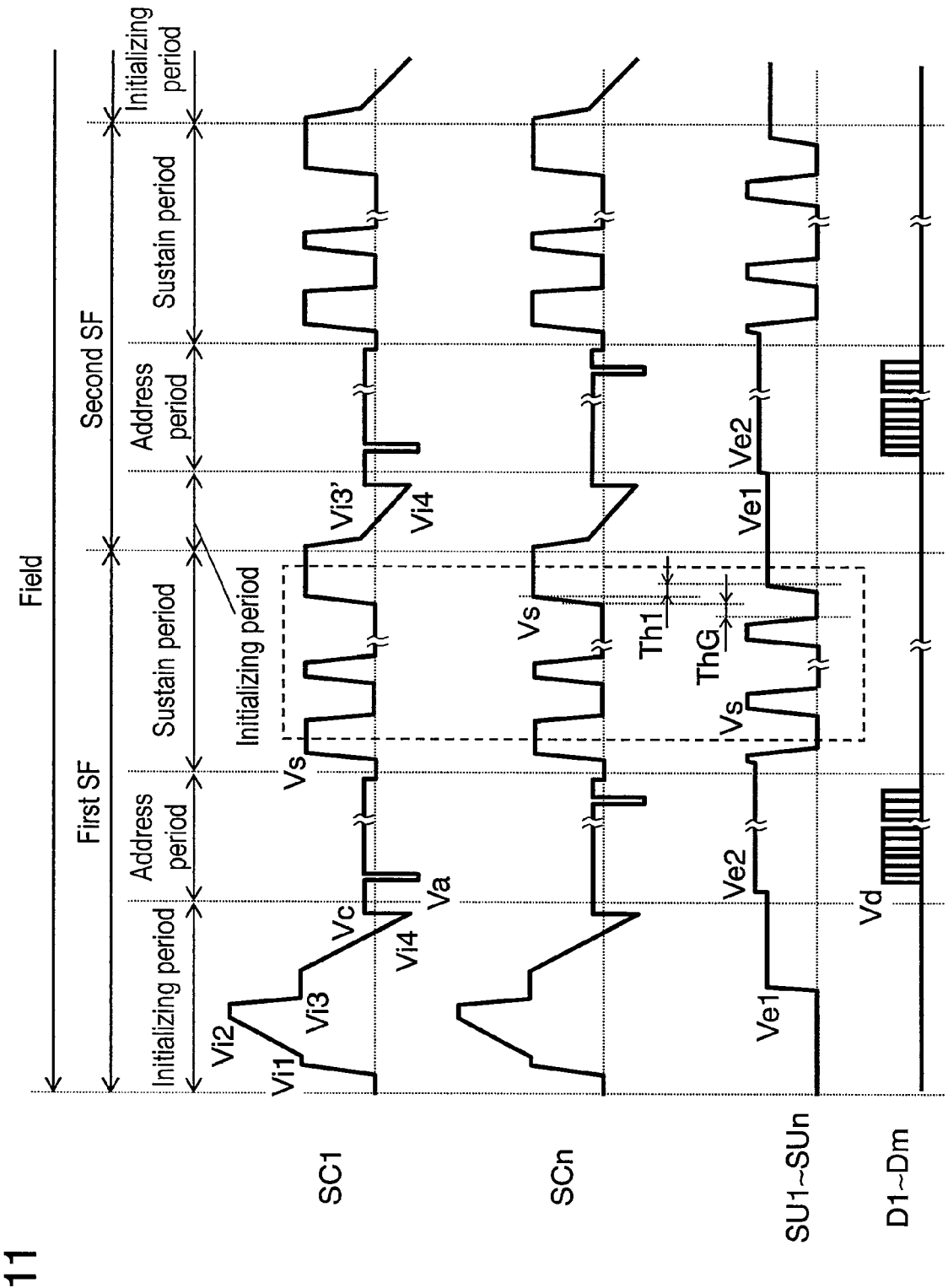
FIG. 11 is a diagram illustrating driving voltage waveforms applied to the electrodes of the panel according to the second embodiment of the invention.
Figures 12, 13:
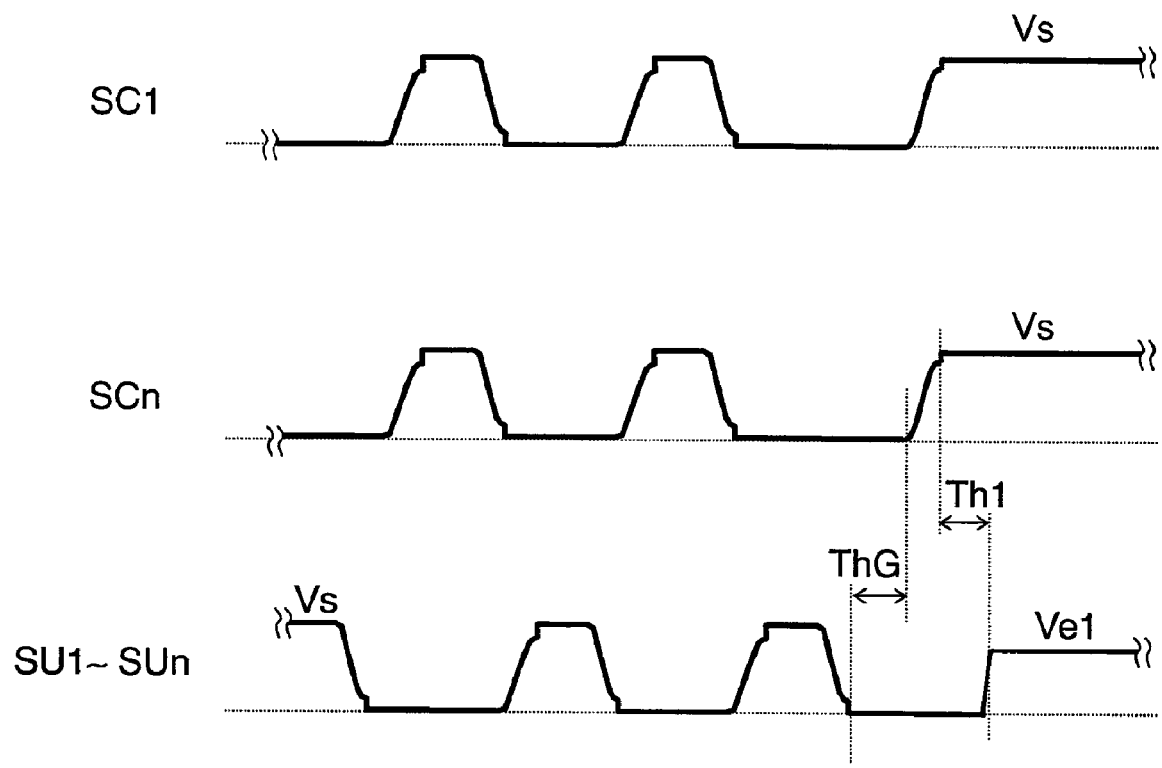
FIG. 12 is a partially enlarged diagram illustrating the driving voltage waveforms applied to the electrodes of the panel according to the second embodiment of the invention.
FIG. 13 is a diagram illustrating a relation between an accumulated electrification time of the panel and the ground period according to the second embodiment of the invention.

FIG. 11 is a diagram illustrating driving voltage waveforms applied to the electrodes of panel 10 according to the second embodiment of the invention. FIG. 12 is a partially enlarged diagram of FIG. 11. The driving voltage waveforms of two sub fields, that is, a sub field (hereinafter, referred to as "all-cell initializing sub field") for performing the all-cell initializing operation and a sub field (hereinafter, referred to as "selection initializing sub field") for performing the selection initializing operation are shown in FIG. 11, but the driving voltage waveforms of other sub fields are substantially the same. FIG. 12 is a partially enlarged diagram of the portion surrounded by the dotted line in FIG. 11 and shows the final portion of the sustain period.

First, the first SF as the all-cell initializing sub field will be described.

In the first half of the initializing period of the first SF, data electrodes D1 to Dm and sustain electrodes SU1 to SUn are kept at 0 V and an ramp waveform voltage (hereinafter, referred to as "rising ramp voltage") slowly rising from voltage Vi1 which is smaller than the breakdown start voltage to voltage Vi2 which is greater than the breakdown start voltage relative to sustain electrodes SU1 to SUn is applied to scan electrodes SC1 to SCn.

Then, while the rising ramp voltage rises, a weak initializing discharge is continuously generated among scan electrodes SC1 to SCn, sustain electrodes SU1 to SUn, and data electrodes D1 to Dm. Negative wall voltages are accumulated on scan electrodes SC1 to SCn and positive wall voltages are accumulated on data electrodes D1 to Dm and sustain electrodes SU1 to SUn. Here, the wall voltages on the electrodes means voltages resulting from the wall charges accumulated on the dielectric layer, the protective layer, and the phosphor layer covering the electrodes.

In the second half of the initializing period, positive voltage Ve1 is applied to sustain electrodes SU1 to SUn, 0 V is applied to data electrodes D1 to Dm, and an ramp waveform voltage (hereinafter, referred to as "falling ramp voltage") slowly falling from voltage Vi3 to voltage Vi4 relative to sustain electrodes SU1 to SUn is applied to scan electrodes SC1 to SCn. In the meantime, a weak initializing discharge is continuously generated among scan electrodes SC1 to SCn, sustain electrodes SU1 to SUn, and data electrodes D1 to Dm. Then, the negative wall voltages on scan electrodes SC1 to SCn and the positive wall voltages on sustain electrodes SU1 to SUn are weakened, whereby the positive wall voltages on data electrodes D1 to Dm are adjusted to a value suitable for the address operation. In this way, the all-cell initializing operation of allowing all the discharge cells to generate the initializing discharge is finished.

In the subsequent address period, sustain electrodes SU1 to SUn are kept at voltage Ve2 and scan electrodes SC1 to SCn are kept at voltage Vc.

Next, negative scan pulse voltage Va is applied to first scan electrode SC1 and positive address pulse voltage Vd is applied to data electrodes Dk (k=1~m) of the discharge cells which should emit light in the first row among data electrodes D1 to Dm. At this time, a voltage difference of an intersection between data electrode Dk and scan electrode SC1 becomes a voltage obtained by adding the difference between the wall voltage of data electrode Dk and the wall voltage of scan electrode SC1 to externally applied voltage difference (Vd−Va), and exceeds the breakdown start voltage. The discharge is generated between data electrode Dk and scan electrode SC1. Since voltage Ve2 is applied to sustain electrodes SU1 to SUn, the voltage difference between sustain electrode SU1 and scan electrode SC1 becomes a voltage value obtained by adding a difference between the wall voltage of sustain electrode SU1 and the wall voltage of scan electrode SC1 to externally applied voltage difference (Ve2−Va). At this time, by setting voltage Ve2 to a voltage value slightly lower than the breakdown start voltage, the space between sustain electrode SU1 and scan electrode SC1 can be made to a state where a discharge is not generated but can be easily generated. Accordingly, using the discharge generated between data electrode Dk and scan electrode SC1 as a trigger, a discharge can be generated between sustain electrode SU1 and scan electrode SC1 at the intersection with data electrode Dk. In this way, the address discharge is generated in the discharge cells which should emit light, a positive wall voltage is accumulated on scan electrode SC1, a negative wall voltage is accumulated on sustain electrode SU1, and a negative wall voltage is accumulated on data electrode Dk.

In this way, the address operation of causing the address discharge in the discharge cells which should emit light in the first row and accumulating wall voltages on the electrodes is performed. On the other hand, since voltages of intersections between data electrodes D1 to Dm not supplied with address pulse voltage Vd and scan electrode SC1 do not exceed the breakdown start voltage, the address discharge is not generated. By performing the address operation up to the n-th row discharge cells, the address period is finished.

In the subsequent sustain period, first, positive sustain pulse voltage Vs is applied to scan electrodes SC1 to SCn and a ground potential as a base potential, that is, 0 V, is applied to sustain electrodes SU1 to SUn. Then, in the discharge cells having generated the address discharge, the voltage difference between scan electrode SCi and sustain electrode SUi becomes a voltage obtained by adding a difference between the wall voltage of scan electrode SCi and the wall voltage of sustain electrode SUi to sustain pulse voltage Vs and thus exceeds the breakdown start voltage.

The sustain discharge is generated between scan electrode SCi and sustain electrode SUi and phosphor layer 35 emits light due to the ultraviolet rays created at that time. A negative wall voltage is accumulated on scan electrode SCi and a positive wall voltage is accumulated on sustain electrode SUi. A positive wall voltage is accumulated on data electrode Dk. In the discharge cells not having generated the address discharge in the address period, the sustain discharge is not generated and the wall voltage at the end of the initializing period is maintained.

Subsequently, 0 V which is the base potential is applied to scan electrodes SC1 to SCn and sustain pulse voltage Vs is applied to sustain electrodes SU1 to SUn. Then, in the discharge cells having generated the sustain discharge, since the voltage between sustain electrode SUi and scan electrode SCi exceeds the breakdown start voltage, the sustain discharge is generated again between sustain electrode SUi and scan electrode SCi, whereby a negative wall voltage is accumulated on sustain electrode SUi and a positive wall voltage is accumulated on scan electrode SCi. Similarly, by alternately applying sustain pulse voltages of the number corresponding to the brightness weights to scan electrodes SC1 to SCn and sustain electrodes SU1 to SUn to cause a potential difference between the electrodes of the display electrode pairs 24, the sustain discharge is continuously generated in the discharge cells having generated the address discharge in the address period.

As shown in FIG. 12, at the last of the sustain period, by applying a potential difference of a so-called narrow pulse shape between scan electrodes SC1 to SCn and sustain electrodes SU1 to SUn, all or a part of the wall voltage on scan electrode SCi and sustain electrode SUi are adjusted to a state where positive wall charges are left on data electrodes Dk.

Specifically, sustain electrodes SUi to SUn are returned to 0 V, a period (hereinafter, referred to as "ground period ThG") in which sustain electrodes SUi to SUn and scan electrodes SC1 to SCn are kept at 0 V is then provided, and then sustain pulse voltage Vs is applied to scan electrodes SC1 to SCn.

Then, in the discharge cells having generated the sustain discharge, the sustain discharge is generated between sustain electrode SUi and scan electrode SCi. Before the discharge converges, that is, while charge particles created due to the discharge sufficiently remain in the discharge space, voltage Ve1 is applied to sustain electrodes SU1 to SUn. Accordingly, the potential difference between sustain electrode SUi and scan electrode SCi is weakened to (Vs−Ve1). Then, in a state where positive wall charges are left on data electrode Dk, the wall voltage between scan electrodes SC1 to SCn and sustain electrodes SU1 to SUn is weakened to the difference (Vs−Ve1) between voltages applied to the electrodes. Hereinafter, this discharge is referred to as "erasing discharge". The potential difference applied between the display electrode pairs 24, that is, between scan electrodes SC1 to SCn and sustain electrodes SU1 to SUn, to generate the erasing discharge has a narrow pulse shape having a small width.

In this way, in a predetermined time interval (hereinafter, referred to as "erasing phase difference Th1") after voltage Vs for generating the final sustain discharge, that is, the erasing discharge, is applied to scan electrodes SC1 to SCn, voltage Ve1 for reducing the potential difference between the electrodes of the display electrode pairs 24 to sustain electrodes SU1 to SUn. In this way, the sustain operation in the sustain period of the first SF is finished.

Here, in the second embodiment, the generation time of the erasing discharge generated at the last of the sustain period is controlled based on the accumulated electrification time of panel 10 measured by an accumulated time measuring circuit to be described later. Specifically, in order to control the generation time of the erasing discharge, as shown in FIG. 12, ground period ThG for keeping the display electrode pairs 24 at the ground potential which is the base potential is provided just before applying the sustain pulse voltage to scan electrodes SC1 to SCn at the last of the sustain period, and the length of ground period ThG is changed in accordance with the accumulated electrification time of panel 10 measured by the accumulated time measuring circuit. Details of this configuration will be described later. Accordingly, it is possible to generate a stable address discharge in a high-brightness panel without increasing the voltage for generating the address discharge, regardless of the accumulated electrification time of the panel.

Next, operations of the second SF which is the selection initializing sub field will be described.

In the initializing period of the second SF, sustain electrodes SU1 to SUn is kept at voltage Ve1, data electrodes D1 to Dm are kept at 0 V, a falling ramp voltage slowly falling from voltage Vi3' to voltage Vi4 is applied to scan electrodes SC1 to SCn.

Then, in the discharge cells having generating the sustain discharge in the sustain period of the previous sub field, a weak initializing discharge is generated and the wall voltages of scan electrode SCi and sustain electrode SUi are weakened. In data electrode Dk, since the positive wall voltage is sufficiently accumulated on data electrode Dk by the previous sustain discharge, the excessive wall voltage is discharged and thus the wall voltage is adjusted to be suitable for the address operation.

On the other hand, in the discharge cells not having generated the sustain discharge in the previous sub field, the wall charges at the end of the initializing period of the previous sub field are maintained without being discharged. In this way, the initializing operation is a selection initializing operation of selectively causing the initializing operation in the discharge cells having generated the sustain operation in the sustain period of the previous sub field.

The operation of the address period is equal to that of the address period of the all-cell initializing sub field and thus its description is omitted. The operation of the subsequent sustain period is equal to that of the sustain period, except for the number of sustain pulses. The operations of the initializing periods of the third SF to the tenth SF are the same selection initializing operation as the second SF and the address operations of the address periods are equal to that of the second SF. The operations of the sustain periods are equal to that of the second SF, except for the number of sustain pulses.

A difference in driving voltage waveform between when the accumulated electrification time measured by the accumulated time measuring circuit is equal to or less than a predetermined time and when the accumulated electrification time is greater than the predetermined time will be described with reference to FIG. 13.

FIG. 13 is a diagram illustrating a relation between the accumulated electrification time and ground time ThG in the panel according to the second embodiment of the invention.

In the second embodiment, as described above, ground period ThG is changed to two different lengths depending on the fact whether or not the accumulated electrification time of panel 10 measured by the accumulated time measuring circuit to be described later is equal to or less than the predetermined time.

Specifically, when it is determined that the accumulated electrification time of panel 10 measured by the accumulated time measuring circuit to be described later is equal to or less than the predetermined time (500 hours or less in the second embodiment), ground period ThG is set to 0 nsec. When it is determined that the accumulated electrification time of panel 10 is more than the predetermined time (more than 500 hours in the second embodiment), ground period ThG is set to 500 nsec.

In this way, in the second embodiment, when the accumulated electrification time of panel 10 is more than the predetermined time, ground period ThG is extended more than that when the accumulated electrification time is not more than the predetermined time, thereby generating a stable address discharge. The reason is as follows.

The discharge characteristic varies depending on the accumulated electrification time of panel 10 and factors for making the discharge unstable, such as a discharge delay (time delay until a discharge is actually generated after a voltage for generating the discharge is applied to the discharge cells) or a dark current (current generated in the discharge cells regardless of the discharge), vary depending on the accumulated electrification time of panel 10. Accordingly, the applied voltage necessary for generating a stable address discharge varies depending on the accumulated electrification time of panel 10.

Figure 14:
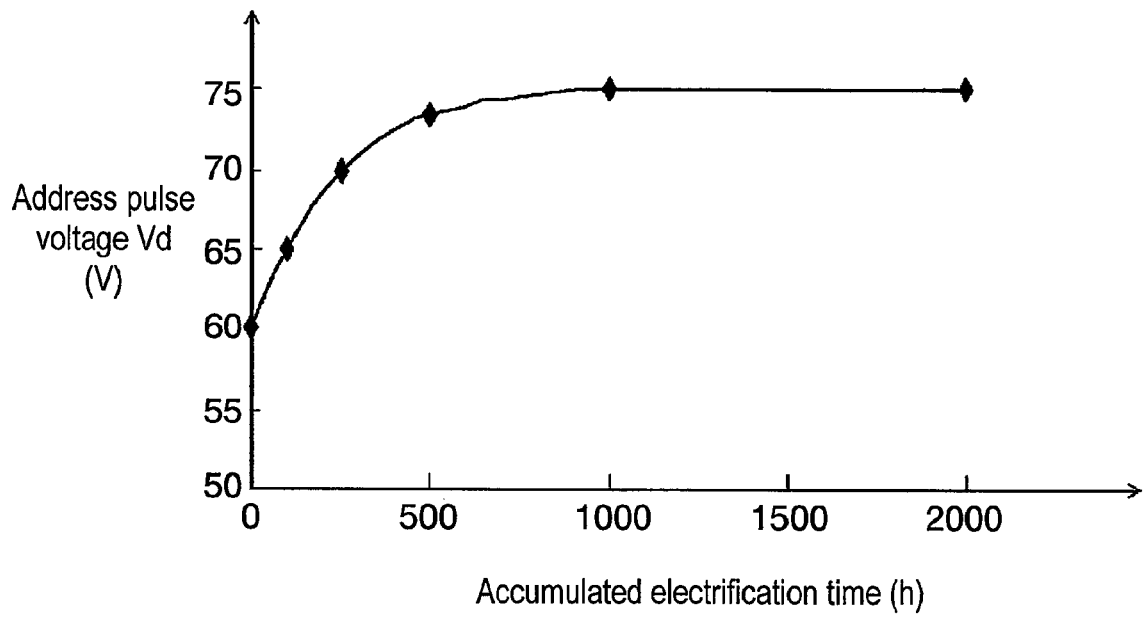
FIG. 14 is a diagram illustrating a relation between the accumulated electrification time of the panel and an address pulse voltage for generating a stable address discharge according to the second embodiment of the invention.

FIG. 14 is a diagram illustrating a relation between the accumulated electrification time of the panel and address pulse voltage Vd for generating a stable address discharge according to the second embodiment of the invention. In FIG. 14, the vertical axis represents address pulse voltage Vd for generating a stable address discharge and the horizontal axis represents the accumulated electrification time of panel 10.

As shown in FIG. 14, address pulse voltage Vd for generating the stable address discharge increases as the accumulated electrification time of panel 10 becomes extended. For example, in an initial state where the accumulated electrification time is about 0 hr, necessary address pulse voltage Vd is about 60 V. However, when the accumulated electrification time is about 500 hours, necessary address pulse voltage Vd is about 73 V, which goes up by about 13 V. After the accumulated electrification time is about 1000 hours, necessary address pulse voltage Vd is about 75 V and hardly varies.

On the other hand, as described above, while the charged particles generated due to the discharge are sufficiently left in the discharge space, the erasing discharge using a narrow pulse changes the electric field in the discharge space and the charged particles are rearranged so as to reduce the changed electric field to form the wall charges, thereby forming the desired wall charges. It is known that the discharge strength of the erasing discharge varies depending on ground period ThG. This is because the state of the wall charges generated due to the sustain discharge just before the erasing discharge varies depending on the length of ground period ThG. It is known that the applied voltage necessary for the subsequent address discharge varies depending on the length of ground period ThG. These factors have the following relations.

Figure 15:
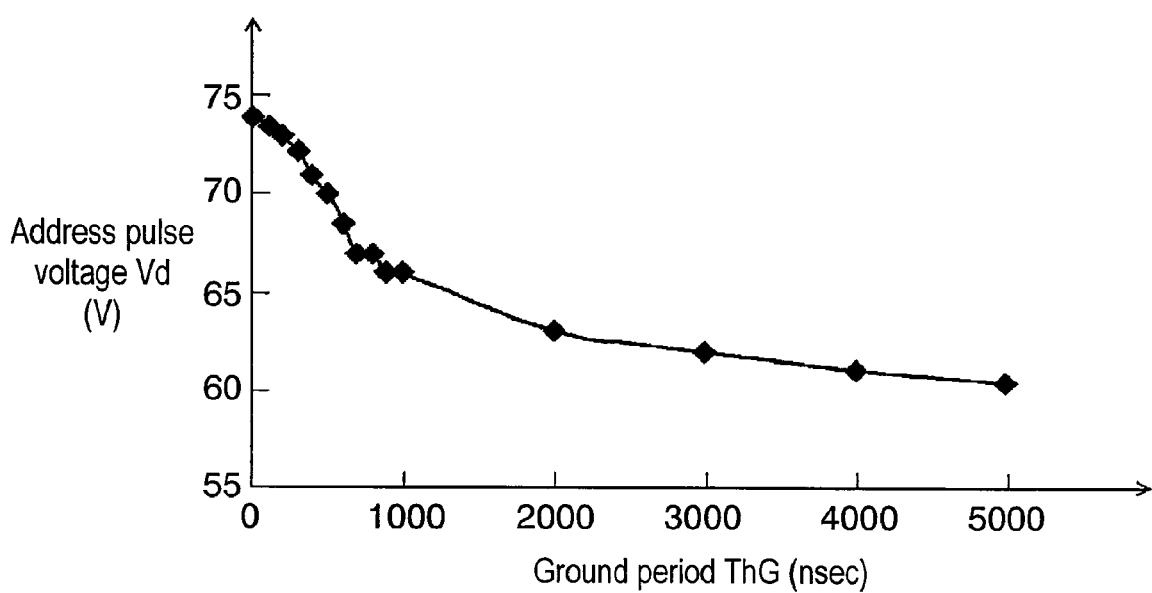
FIG. 15 is a diagram illustrating a relation between a ground period and an address pulse voltage for generating a stable recording discharge according to the second embodiment of the invention.

FIG. 15 is a diagram illustrating a relation between ground period ThG and address pulse voltage Vd for generating a stable recording discharge according to the second embodiment of the invention. In FIG. 15, the vertical axis represents address pulse voltage Vd for generating a stable address discharge and the horizontal axis represents ground period ThG.

As shown in FIG. 15, address pulse voltage Vd for generating a stable address discharge varies depending on the length of ground period ThG and address pulse voltage Vd for generating the stable address discharge is lowered with an increase in length of ground period ThG. For example, when ground period ThG is about 0 nsec, address pulse voltage Vd necessary for address is about 74 V. On the contrary, when ground period ThG is about 500 nsec, address pulse voltage Vd is about 68 V, which is lower by about 6 V.

In this way, when the accumulated electrification time increases, address pulse voltage Vd for generating the stable address discharge increases. On the contrary, by extending the length of ground period ThG, it was confirmed that address pulse voltage Vd for generating the stable address discharge is lowered. That is, by changing the length of ground period ThG depending on the accumulated electrification time, the rising amount of address pulse voltage Vd necessary for address, which results from the increase in accumulated electrification time can be compensated for, thereby generating the stable address discharge without increasing the necessary address pulse voltage Vd.

Therefore, in the second embodiment, the accumulated electrification time of panel 10 is measured by the accumulated time measuring circuit to be described later. As shown in FIG. 13, ground period ThG is set to about 0 nsec when the accumulated electrification time is equal to or less than a predetermined time (500 hours or less in the second embodiment) and ground period ThG is set to about 500 nsec when the accumulated electrification time is more than the predetermined time (more than 500 hours in the second embodiment). Accordingly, it is possible to perform a stable addressing operation without increasing address pulse voltage Vd for generating the stable address discharge.

When ground period ThG increases, it was confirmed that the voltage value of voltage Ve2 necessary for address increases, in the contrary to address pulse voltage Vd.

Figure 16:
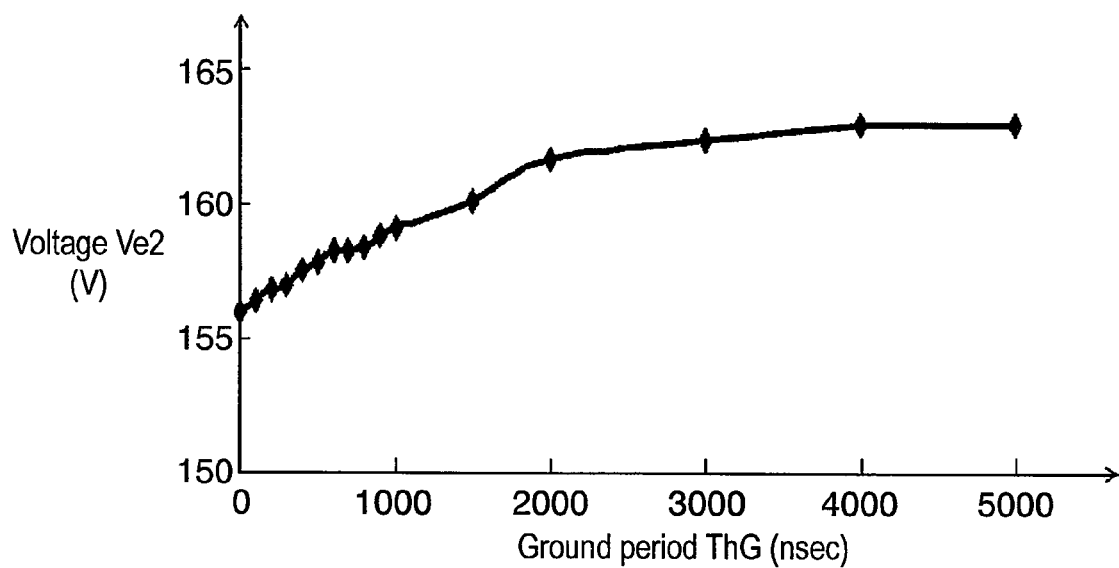
FIG. 16 is a diagram illustrating a relation between the ground period and a voltage for generating a stable address discharge according to the second embodiment of the invention.

FIG. 16 is a diagram illustrating a relation between ground period ThG and voltage Ve2 for generating a stable address discharge according to the second embodiment of the invention. In FIG. 16, the vertical axis represents voltage Ve2 for generating the stable address discharge and the horizontal axis represents ground period ThG. As shown in FIG. 16, voltage Ve2 for generating the stable address discharge varies depending on the length of ground period ThG. Voltage Ve2 for generating the stable address discharge is about 156 V, for example, when ground period ThG is about 0 nsec, while voltage Ve2 is about 158 V, which is higher by about 2V, when ground period ThG is about 500 nsec.

However, when the accumulated electrification time is extended, it was confirmed that the voltage value of voltage Ve2 decreases, in the contrary to address pulse voltage Vd.

Figure 17:
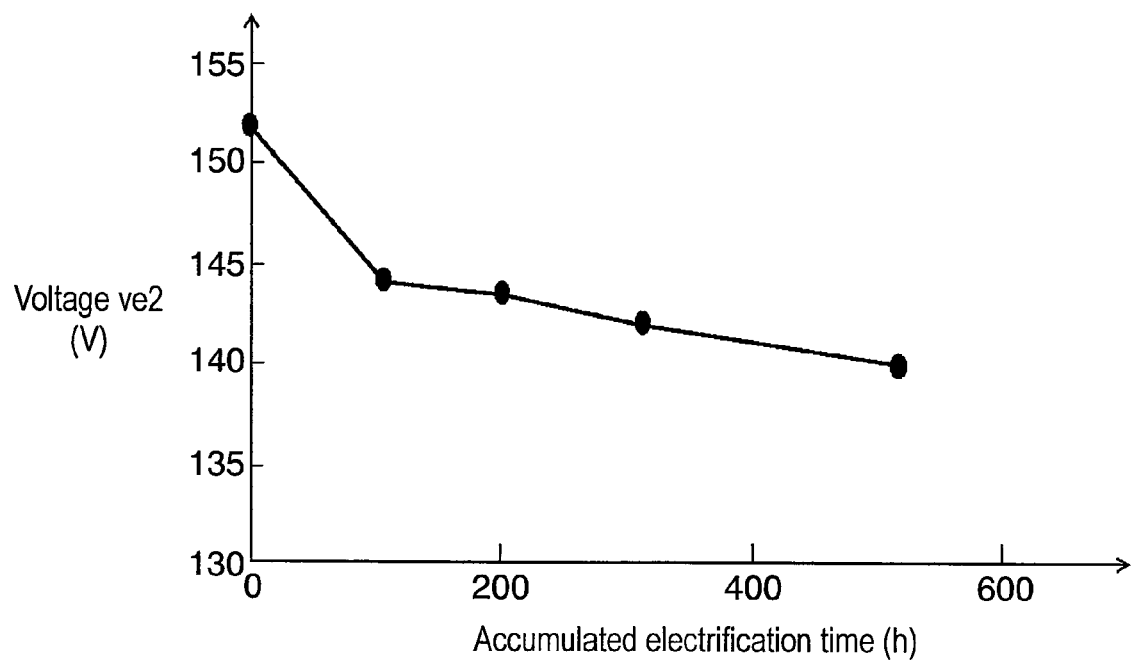
FIG. 17 is a diagram illustrating a relation between an accumulated electrification time of the panel and the voltage for generating a stable address discharge according to the second embodiment of the invention.

FIG. 17 is a diagram illustrating a relation between the accumulated electrification time of the panel and voltage Ve2 for generating the stable address discharge according to the second embodiment of the invention. In FIG. 17, the vertical axis represents voltage Ve2 for generating the stable discharge address and the horizontal axis represents the accumulated electrification time of panel 10. As shown in FIG. 17, when the accumulated electrification time of panel 10 increases, voltage Ve2 for generating the stable address discharge is lowered. For example, voltage Ve2 is about 152 V in the initial state where the accumulated electrification time is about 0 hour, while voltage Ve2 is about 140 V, which is lower by 12 V, when the accumulated electrification time is about 500 hours.

That is, it was confirmed regarding voltage Ve2 that the length of ground period ThG is preferably as small as possible when the accumulated electrification time is equal to or less than the predetermined time, and the extension of ground period ThG causes any particular problem when the accumulated electrification time is more than the predetermined time.

When ground period ThG is too great, the erasing discharge is insufficient and the charge particles for reducing the electric field are insufficient, thereby not forming the desired wall charges. Accordingly, when it is intended to generate the address discharge, the wall charges are insufficient, thereby causing the address failure that the address discharge is not generated. Therefore, in the second embodiment, ground period ThG is changed to 0 nsec and 500 nsec, in consideration of the above-mentioned situation.

These experiments were performed using 50-inch panel having 1080 display electrode pairs and the above-mentioned numerical values are based on the panel. Accordingly, the second embodiment is not limited to the numerical values.

Next, a configuration of the plasma display device according to the second embodiment will be described.

Figure 18:
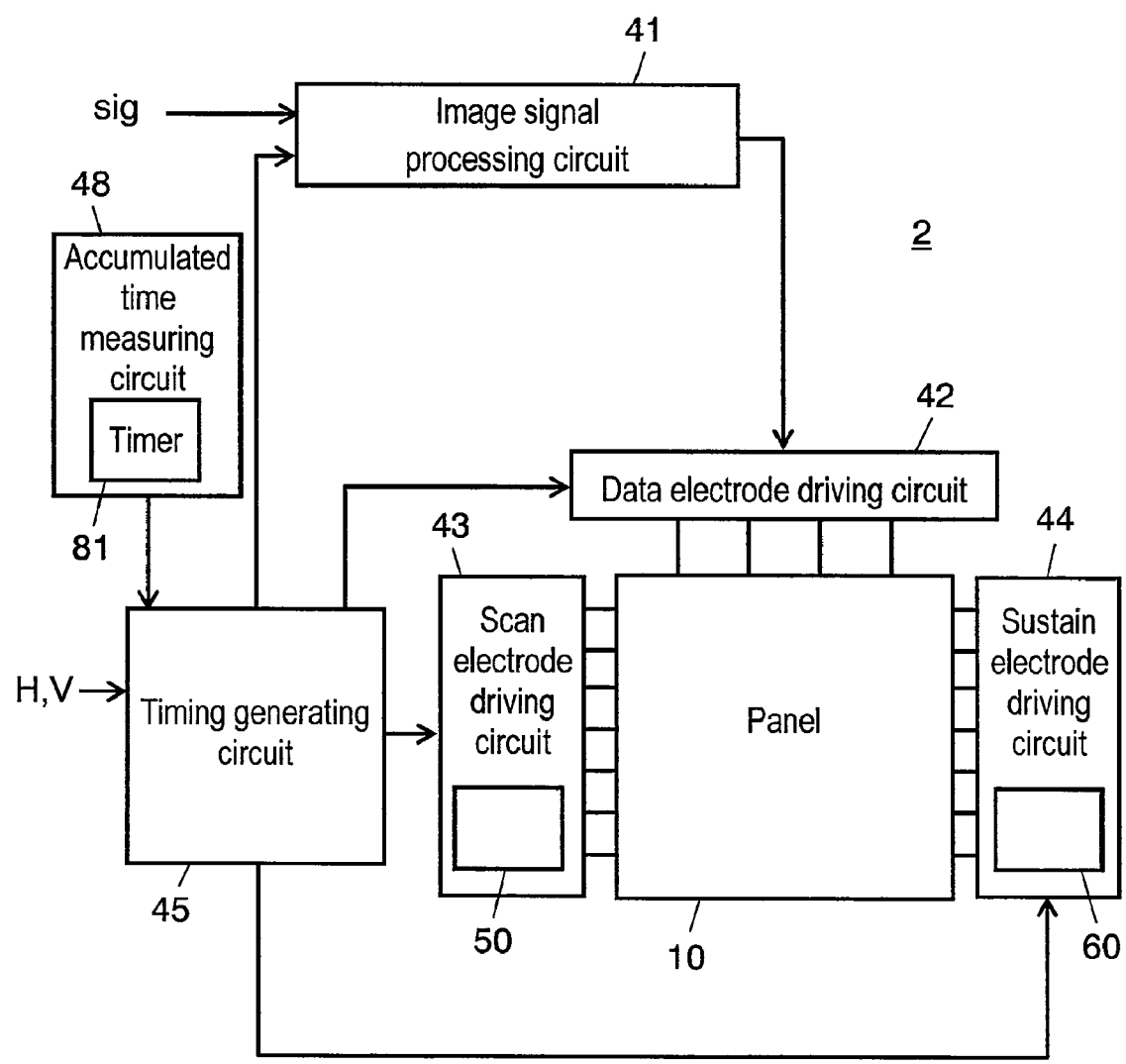
FIG. 18 is a circuit block diagram illustrating the plasma display device according to the second embodiment of the invention.

FIG. 18 is a circuit block diagram illustrating the plasma display device according to the second embodiment of the invention. Plasma display device 2 includes panel 10, image signal processing circuit 41, data electrode driving circuit 42, scan electrode driving circuit 43, sustain electrode driving circuit 44, timing generating circuit 45, accumulated time measuring circuit 48, and a power supply circuit (not shown) for supplying power to the circuit blocks.

Image signal processing circuit 41 converts input image signal sig into image data indicating emission or non-emission of light every sub field. Data electrode driving circuit 42 converts the image data every sub field into signals corresponding to data electrodes D1 to Dm to drive data electrodes D1 to Dm.

Accumulated time measuring circuit 48 includes generally known timer 81 having an adder function of increasing a numerical value by a constant value per unit time in the course of electrifying panel 10. Timer 81 accumulates its measured time without reset and thus can measure the accumulated time of the time for electrifying panel 10. Accumulated time measuring circuit 48 compares the accumulated electrification time of panel 10 measured by timer 81 with a predetermined threshold value, determines whether the accumulated electrification time of panel 10 is more than a predetermined time, and outputs a signal indicating the determination result to timing generating circuit 45.

In the second embodiment, the threshold value is set to 500 hours. However, the threshold value is not limited to the numerical value, but may be set to the optimal value depending on the characteristics of the panel or the specifications of the plasma display device.

Timing generating circuit 45 generates various timing signals for controlling the circuit blocks based on a horizontal synchronization signal H, a vertical synchronization signal V, and the accumulated electrification time of panel 10 measured by accumulated time measuring circuit 48 and supplies the generated timing signals to the circuit blocks. As described above, in the second embodiment, ground period ThG is controlled based on the accumulated electrification time and the corresponding timing signal is output to sustain electrode driving circuit 44. Accordingly, it is possible to control to stabilize the address operation.

Scan electrode driving circuit 43 includes initializing waveform generating circuit (not shown) for generating initializing waveform voltage which is applied to scan electrodes SC1 to SCn in the initializing period, sustain pulse generating circuit 50 for generating a sustain pulse voltage which is applied to scan electrodes SC1 to SCn in the sustain period, and scan pulse generating circuit (not shown) for generating a scan pulse voltage which is applied to scan electrodes SC1 to SCn in the address period, and drives the scan electrodes SC1 to SCn based on the timing signals. Sustain electrode driving circuit 44 includes sustain pulse generating circuit 60 and circuits for generating voltage Ve1 and voltage Ve2, and drives sustain electrodes SU1 to SUn based on the timing signals.

Next, details and operations of sustain pulse generating circuits 50 and 60 will be described.

Figure 19:
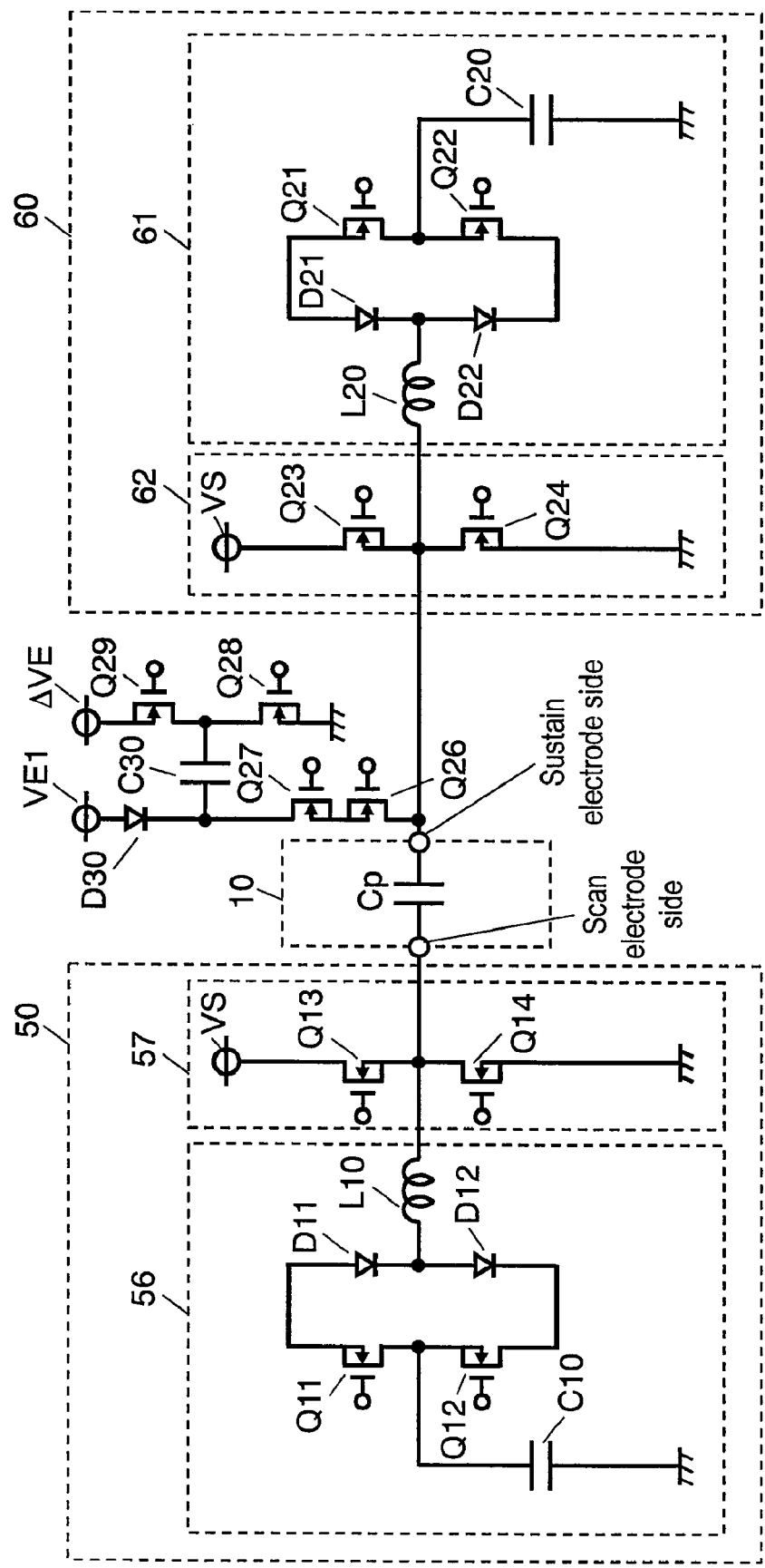
FIG. 19 is a circuit diagram illustrating a sustain pulse generating circuit according to the second embodiment of the invention.

FIG. 19 is a circuit diagram illustrating sustain pulse generating circuits 50 and 60 according to the second embodiment of the invention. In FIG. 19, an inter-electrode capacitor of panel 10 is denoted by Cp and circuits for generating the scan pulse and the initializing voltage waveform are omitted.

Sustain pulse generating circuit 50 includes power recovery circuit 56 and clamp circuit 57. The power recovery circuit 56 and the clamp circuit 57 are connected to scan electrodes SC1 and SCn as ends of inter-electrode capacitors Cp of panel 10 through the scan pulse generating circuit (not shown because it is short-circuited in the sustain period).

The power recovery circuit 56 includes power recovery capacitor C10, switching elements Q11 and Q12, reverse-current preventing diodes D11 and D12, and resonating inductor L10. The power recovery circuit 56 allows inter-electrode capacitor CP and inductor L10 to resonate in an LC manner so as to raise and lower the sustain pulse. In this way, since power recovery circuit 56 drives scan electrodes SC1 to SCn by the use of the LC resonance without any supply of power from the power source, it has no power consumption ideally. Power recovery capacitor C10 has sufficiently great capacitance than that of inter-electrode capacitor Cp and is filled with about Vs/2 which is a half of voltage value Vs so as to serve as a power source of power recovery circuit 56.

Clamp circuit 57 includes switching element Q13 for clamping scan electrodes SC1 to SCn to voltage Vs and switching element Q14 for clamping scan electrodes SC1 to SCn to 0 V. The clamp circuit connects scan electrode SC1 to SCn to voltage source Vs through switching element Q13 to clamp the scan electrodes to voltage Vs and connects scan electrodes SC1 to SCn to the ground through switching element Q14 to clamp the scan electrodes to 0 V. Accordingly, the impedance at the time of applying a voltage to voltage clamp circuit 57 is small and thus it is possible to allow large discharge current due to a strong sustain discharge to stable flow.

Sustain pulse generating circuit 50 operates power recovery circuit 56 and voltage clamp circuit 57 by switching the ON and OFF of switching elements Q11, Q12, Q13, and Q14 based on the timing signals output from the timing generating circuit 45, thereby generating sustain pulse voltage Vs. Details thereof will be described later. The switching elements can be constructed by generally known elements such as MOSFET or IGBT.

Sustain pulse generating circuit 60 includes power recovery circuit 61 having power recovery capacitor C20, switching elements Q21 and Q22, reverse-current preventing diodes D21 and D22, and resonating inductor L20 and clamp circuit 62 having switching element Q23 for clamping sustain electrodes SU1 to SUn to voltage Vs and switching element Q24 for clamping sustain electrodes SU1 to SUn to the ground potential and is connected to sustain electrodes SU1 to SUn which are ends of inter-electrodes capacitors Cp of panel 10. The operations of sustain pulse generating circuit 60 is the same as sustain pulse generating circuit 50 and thus its description will be omitted.

In FIG. 19, power source VE1 for generating voltage Ve1, switching elements Q26 and Q27 for applying voltage Ve1 to sustain electrodes SU1 to SUn, power source ΔVE for generating voltage ΔVe, reverse-current preventing diode D30, capacitor C30, and switching elements Q28 and Q29 for adding voltage ΔVe to voltage Ve1 to form voltage Ve2 are shown. For example, at the time for applying voltage Ve1 shown in FIG. 11, switching elements Q26 and Q27 are turned on to apply positive voltage Ve1 to sustain electrodes SU1 to SUn through diode D30 and switching elements Q26 and Q27. At this time, switching element Q28 is turned on and capacitor C30 is charged so that the voltage becomes voltage Ve1. At the times for applying voltage Ve2 shown in FIG. 11, switching element Q28 is turned off and switching element Q29 is turned on with switching elements Q26 and Q27 turned on and voltage ΔVe is added to the voltage of capacitor C30, thereby applying voltage Ve1+ΔVe, that is, voltage Ve2, to sustain electrodes SU1 to SUn. At this time, current from capacitor C30 to power source Ve1 is blocked by means of the operation of reverse-current preventing diode D30.

The circuits for applying voltage Ve1 and voltage Ve2 are not limited to the circuits shown in FIG. 19, but the voltages may be applied to sustain electrodes SU1 to SUn, for example, using the power source for generating voltage Ve1, the power source for generating voltage Ve2, and plural switching elements for applying the voltages to sustain electrodes SU1 to SUn.

The LC resonance period of inductor L10 of power recovery circuit 56 and inter-electrode capacitor Cp of panel 10 and the LC resonance period (hereinafter, referred to as "resonance period") of inductor L20 of power recovery circuit 61 and inter-electrode capacitor Cp can be calculated from "$2\pi(LCp)^{1/2}$" when it is assumed that inductances of inductors L10 and L20 are L. In the second embodiment, inductors L10 and L20 are set so that the resonance period of power recovery circuits 56 and 61 is about 1100 nsec. However, this numerical value is only an example in the second embodiment, but may be set to the optimal value depending on the characteristics of the panel or the specifications of the plasma display device.

Next, details of the driving voltage waveforms will be described.

Figure 20:
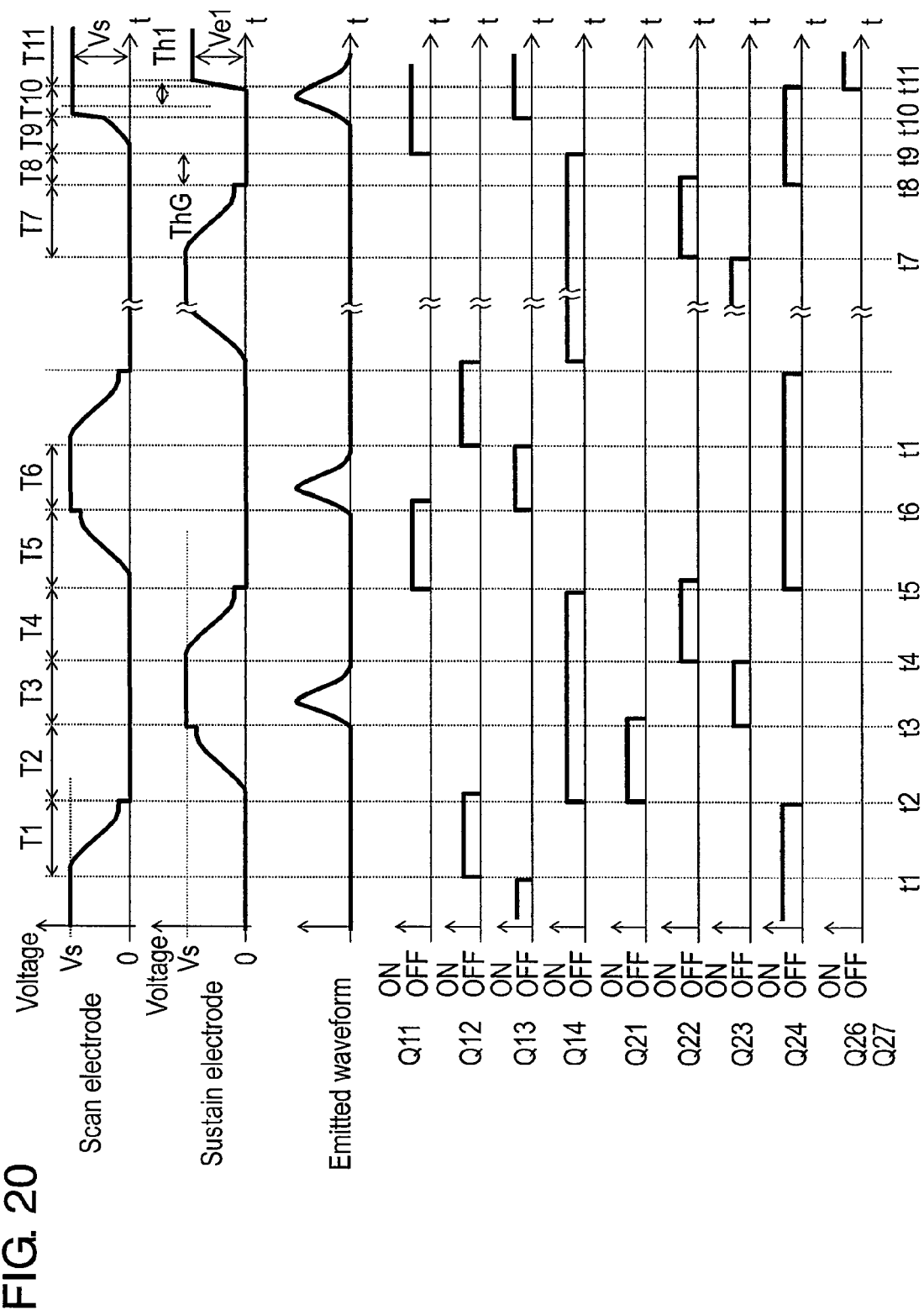
FIG. 20 is a timing diagram illustrating operations of the sustain pulse generating circuit according to the second embodiment of the invention.

FIG. 20 is a timing diagram illustrating operations of sustain pulse generating circuits 50 and 60 according to the second embodiment of the invention and shows details of the portion surrounded by a dotted line in FIG. 11. First, one period of a sustain pulse is divided into six periods of T1 to T6 and then the respective periods will be described.

In the following description, the operation of turning on a switching element is called turn-on and the operation of turning off a switching element is called turn-off. In the drawings, a signal for turning on a switching element is marked as "ON" and a signal for turning off a switching element is marked as "OFF."

(Period T1)

At time t1, switching element Q12 is turned on. Then, charges close to scan electrodes SC1 to SCn starts flowing to capacitor C10 through inductor L10, diode D12, and switching element Q12 and thus the voltage of scan electrodes SC1 to SCn starts falling down. Since inductor L10 and inter-electrode capacitor Cp form a resonance circuit, the voltage of scan electrodes SC1 to SCn at time t2 after ½ of the resonance period passes goes down to the vicinity of 0 V. However, the voltage of scan electrodes SC1 to SCn does not go down to 0 V due to the power loss resulting from a resistive component of the resonance circuit. In the meanwhile, switching element Q24 is kept in the ON state.

(Period T2)

At time t2, switching element Q14 is turned on. Since scan electrodes SC1 to SCn are connected directly to the ground through switching element Q14, the voltage of scan electrodes SC1 to SCn forcibly goes down to 0 V.

At time t2, switching element Q21 is turned on. Then, current starts flowing from power recovery capacitor C20 through switching element Q21, diode D21, and inductor L20 and the voltage of sustain electrodes SU1 to SUn starts going up. Since inductor L20 and inter-electrode capacitor Cp form a resonance circuit, the voltage of sustain electrodes SU1 to SUn at time t3 after ½ of the resonance period passes goes up to the vicinity of Vs. However, the voltage of sustain electrodes SU1 to SUn does not go up to Vs due to the power loss resulting from the resistive component of the resonance circuit.

(Period T3)

At time t3, switching element Q23 is turned on. Then, since sustain electrodes SU1 to SUn are connected directly to power source VS through switching element Q23, the voltage of sustain electrodes SU1 to SUn forcibly goes up to Vs. Then, in the discharge cells having generated the address discharge, the voltage between scan electrode SCi and sustain electrode SUi exceeds the breakdown start voltage and thus the sustain discharge is generated.

(Periods T4 to T6)

Since the sustain pulse applied to scan electrodes SC1 to SCn and the sustain pulse applied to sustain electrodes SU1 to SUn have the same waveform, the operations of periods T4 to T6 are equivalent to the operations of period T1 to T3, except that scan electrodes SC1 to SCn and sustain electrodes SU1 to SUn are replaced with each other, and thus its description is omitted.

Switching element Q12 is turned off from time t2 to time t5 and switching element Q21 is turned off from time t3 to time t4. Switching element Q22 is turned off from time t5 to time t2 and switching element Q11 is turned off from t6 to time t1. In order to decrease the output impedance of scan pulse generating circuits 50 and 60, it is preferable that switching element Q24 is turned off just before time t2 and switching element Q13 is turned off just before time t1. It is also preferable that switching element Q14 is turned off just before time t5 and switching element Q23 is turned off just before time t4.

In the sustain period, the operations of periods T1 to T6 are repeated by the necessary number of pulses. In this way, the sustain pulse voltage varying from 0 V as the base potential to voltage Vs as a potential for generating the sustain discharge is alternately applied to the display electrode pairs 24, thereby allowing the discharge cells to generate the sustain discharge.

Next, the final erasing discharge in the sustain period will be described in detail into five periods of T7 to T11.

(Period T7)

This period is equal to period T4, in which the sustain pulse applied to sustain electrodes SU1 to SUn goes down. That is, by turning off switching element Q23 just before time t7 and turning on switching element Q22 at time t7, the charges close to sustain electrodes SU1 to SUn start flowing to capacitor C20 through inductor L20, diode D22, and switching element Q22 and the voltage of sustain electrodes SU1 to SUn starts going down.

(Period T8)

By turning on switching element Q24 at time t8, the voltage of sustain electrodes SU1 to SUn is forcibly made to go down to 0 V. Since switching element Q14 is kept on from period T7 and thus the voltage of scan electrodes SC1 to SCn is kept at 0 V, display electrode pairs 24, that is, scan electrodes SC1 to SCn and sustain electrodes SU1 to SUn, are connected to ground voltage 0 V as the base potential in period T8.

In this way, a period for clamping display electrode pairs 24 to base potential 0 V and setting both electrodes of display electrode pairs 24 to base potential 0 V is provided between the sustain pulse for generating the final sustain discharge and the previous sustain pulse and the period is used as ground period ThG.

(Period T9)

By turning off switching element Q14 just before time t9 and turning on switching element Q11 at time t9, current start flowing from power recovery capacitor C10 through switching element Q11, diode D11, and inductor L10 and the voltage of scan electrodes SC1 to SCn starts going up.

In the second embodiment, in a time interval (0 nsec or 500 nsec in the second embodiment) corresponding to the accumulated electrification time of panel 10 measured by accumulated time measuring circuit 48 after turning on switching element Q24 for clamping sustain electrodes SU1 to SUn to 0 V, the control of the ground period ThG is performed by turning on switching element Q11 for supplying power from power recovery capacitor C10 to scan electrodes SC1 to SCn. Accordingly, until a switching element actually starts its operation after a control signal is input to the switching element, a delay due to the delay time of the switching element or the like occurs, but the time interval of the control signal input to the switching element, that is, from time t8 to time t9, can be considered as ground period ThG.

(Period T10)

Since inductor L10 and inter-electrode capacitor Cp form a resonance circuit, the voltage of scan electrodes SC1 to SCn goes up to the vicinity of Vs after ½ of the resonance period passes. However, in this case, switching element Q13 is turned on in a period shorter than ½ of the resonance period of the power recovery section, that is, at time t10 before the voltage of scan electrodes SC1 to SCn goes up to the vicinity of Vs. Then, since scan electrodes SC1 to SCn are connected directly to power source Vs through switching element Q13, the voltage of scan electrodes SC1 to SCn goes up to Vs rapidly, thereby generating the sustain discharge.

(Period T11)

Switching element Q24 is turned off just before time t11 and switching element Q26 and switching element Q27 are turned on at time t11. Then, since sustain electrodes SU1 to SUn are connected directly to erasing power source VE1 through switching elements Q26 and Q27, the voltage of sustain electrodes SU1 to SUn is forcibly made to go up to Ve1. Time t11 is a time before the discharge generated in period T10 converges, that is, a time when charged particles generated by the discharge are sufficiently left in the discharge space. Since the electric field in the discharge space is changed while the charged particles are sufficiently left in the discharge space, the charged particles are re-arranged so as to reduce the changed electric field, thereby forming wall charges.

At this time, since a difference between voltage applied to scan electrodes SC1 to SCn and voltage applied to sustain electrodes SU1 to SUn becomes small by applying voltage Ve1 to sustain electrode SU1 to SUn, the wall voltages on scan electrodes SC1 to SCn and sustain electrodes SU1 to SUn are weakened. In this way, the potential difference for generating the final sustain discharge is a potential difference of a narrow pulse shape adjusted so as to reduce the potential difference applied across the display electrode pairs 24 before the final sustain discharge converges, and the generated sustain discharge is an erasing discharge. Although not shown in FIG. 20, since data electrodes D1 to Dm are kept at 0 V and the charged particles form wall charges so as to reduce a potential difference between the voltage applied to data electrodes D1 to Dm and the voltage applied to scan electrodes SC1 to SCn, a positive wall voltage is formed on data electrodes D1 to Dm. Voltage Ve1 is set to be smaller than voltage Vs so that the polarities of the wall charges of scan electrodes SC1 to SCn and sustain electrodes SU1 to SUn.

In this way, a predetermined time interval is disposed between the time point when the sustain pulse for generating the final sustain discharge is applied to scan electrodes SC1 to SCn and the time point when the voltage for reducing the potential difference between electrodes of display electrode pairs 24 is applied to sustain electrodes SU1 to SUn and the time interval is used as erasing phase difference Th1.

As described above, in the second embodiment, ground period ThG for clamping display electrode pairs 24 to the ground potential as the base potential and setting both electrodes of display electrode pairs 24 to the ground potential is disposed between the sustain pulse for generating the final sustain discharge in the sustain period and the previous sustain pulse and thus the length of ground period ThG is changed based on the accumulated electrification time of panel 10. That is, ground period ThG is set to 0 nsec when the accumulated electrification time of panel 10 measured by the accumulated time measuring circuit 48 is equal to or less than the predetermined time (equal to or less than 500 hours in the second embodiment) and ground period ThG is set to 500 nsec when it is determined that the accumulated electrification time is more than the predetermined time (more than 500 hours in the second embodiment). Accordingly, it is possible to perform a stable address operation without increasing the voltage for generating a stable address discharge.

In the second embodiment, ground periods ThG in all the sub fields are set to 0 nsec when the accumulated electrification time is equal to or less than the predetermined time and ground periods ThG in all the sub fields are set to 500 nsec when the accumulated electrification time is more than the predetermined time. However, the invention is not limited to the above-mentioned configuration, but may have another sub field configuration.

For example, a sub field of setting ground period ThG to 500 nsec when the accumulated electrification time is equal to or less than the predetermined time may be provided. A sub field of setting ground period ThG to 0 nsec when the accumulated electrification time is more than the predetermined time may be provided. In the invention, at least one sub field in which ground period ThG is extended when the accumulated electrification time is more than the predetermined time may be included in one field period. Accordingly, the following advantages can be obtained.

It has been described in the second embodiment that ground period ThG is set to 0 nsec when the accumulated electrification time is equal to or less than the predetermined time and ground period ThG is set to 500 nsec when the accumulated electrification time is more than the predetermined time. However, these numerical values are only examples. For example, ground period ThG may be set to 100 nsec or 200 nsec when the accumulated electrification time is equal to or less than the predetermined time, or ground period ThG may be set to 400 nsec or 600 nsec when the accumulated electrification time is more than the predetermined time. The numerical values can be set to the optimal values depending on the characteristics of the panel or the specification of the plasma display device. In the second embodiment, it should be enough so long as ground period ThG is extended when the accumulated electrification time is more than the predetermined time.

Although it has been described in the second embodiment that 500 hours is set as the predetermined time and the ground period ThG is changed depending on the result whether the accumulated electrification time is more than 500 hours or not, the predetermined time is not limited to the numerical value, but may be set to the optimal value depending on the characteristics of the panel or the specification of the plasma display device. For example, plural threshold values of 500 hours, 750 hours, and 1000 hours may set and ground period ThG may be gradually extended. Alternatively, a ratio of the sub field in which ground period ThG is extended to one field period may be gradually increased.

Although it has been described in the second embodiment that ground period ThG is changed when the accumulated electrification time is more than the predetermined time, the driving operation using the same driving waveform as the previous driving operation may be continuously performed until the plasma display device is changed temporarily in the non-operating state after the accumulated electrification time is more than the predetermined time and then ground period ThG may be changed at the time of starting a next operation. For example, if plasma display device 2 is in an operating state, that is, while timing generating circuit 45 is in an operation and is outputting timing signals for driving panel 10, timing generating circuit 45 outputs the same timing signals as the previous operation for driving panel 10 even when a signal indicating that the accumulated electrification time is more than the predetermined time is output from accumulated time measuring circuit 48. When the plasma display device is temporarily turned off and the plasma display device is then turned on to start the driving of panel 10, timing generating circuit 45 may output a timing signal for extending ground period ThG. According to this configuration, it is possible to prevent a variation in brightness which may be generated by changing the length of ground period ThG in operation of plasma display device 2, thereby enhancing image display quality.

Although it has been described in the second embodiment that the partial pressure of xenon in the discharging gas is 10%, the driving voltage may be set for the panel with even a different partial pressure of xenon.

Other specific numerical values used in the second embodiment are only examples and can be set to the optimal values depending on the characteristics of the panel or specifications of the plasma display device. The numerical values have an allowable range that allows the acquisition of the above-mentioned advantages.

INDUSTRIAL APPLICABILITY

The plasma display device and the plasma-display-panel driving method according to the invention can generate a stable address discharge in a large-screen and high-brightness panel without increasing a voltage for generating the address discharge and that can reduce a crosstalk, thereby improving image display quality. The invention is useful as the plasma display device and the plasma-display-panel driving method that can generate a stable address discharge in a high-brightness panel without increasing a voltage for generating the address discharge, regardless of an accumulated electrification time for the panel, thereby improving image display quality.

The invention claimed is:

1. A plasma display device comprising:
a plasma display panel having a plurality of discharge cells, each discharge cell having a display electrode pair formed of a scan electrode and a sustain electrode; and
a driving circuit driving the plasma display panel by dividing a field period into a plurality of sub fields, each sub field having an address period for selecting the discharge cell to emit light and a sustain period for allowing the discharge cell selected in the address period to generate a sustain discharge,
wherein the driving circuit includes:
a sustain pulse generating circuit having:
a power recovery circuit recovering power accumulated in inter-electrode capacitors of the display electrode pairs and supplying the recovered power to the display electrode pairs; and
a clamp circuit having a first switching element clamping the display electrode pairs to a source voltage and a second switching element clamping the display electrode pairs to a base potential; and
a third switching element applying a voltage for reducing a potential difference between the display electrode pairs to the display electrode pairs, and
wherein the sustain pulse generating circuit alternately applies a sustain pulse varying from the base potential to a potential causing a sustain discharge in the sustain period to the display electrode pairs and
disposes a period for setting the display electrode pairs to the base potential between the sustain pulse for causing a final sustain discharge in the sustain period and a previous sustain pulse thereof.

2. The plasma display device of claim 1,
wherein in a predetermined time interval after the final sustain pulse is applied to one of the display electrode pairs to generate the final sustain discharge in the sustain period, the voltage for reducing the potential difference between electrodes of the display electrode pairs is applied to the display electrode pairs.

3. The plasma display device of claim 1,
wherein a period for connecting the display electrode pairs to the base potential is changed depending on a lighting ratio in the sub field.

4. The plasma display device of claim 3,
wherein at least one sub field controlled to change the period for connecting the display electrode pairs to the base potential based on a comparison result of a predetermined threshold value with the lighting ratio of the discharge cells is included in a field period.

5. The plasma display device of claim 1, further comprising:
an accumulated time measuring circuit measuring an accumulated time of the time when the plasma display panel is electrified,
wherein the period for setting the display electrode pairs to the base potential between the sustain pulse for causing the final sustain discharge in the sustain period and the previous sustain pulse is changed depending on the accumulated time measured by the accumulated time measuring circuit.

6. The plasma display device of claim 5,
wherein the accumulated time measuring circuit determines whether the measured accumulated time exceeds a predetermined time, and
wherein the driving circuit allows the field period to include at least one sub field in which the period for setting the display electrode pairs to the base potential is extended when it is determined that the accumulated time measured by the accumulated time measuring circuit exceeds the predetermined time.

7. The plasma display device of claim 6,
wherein the driving circuit performs continuously the driving operation until the plasma display device is changed to a non-operating state when it is determined that the accumulated time measured by the accumulated time measuring circuit exceeds the predetermined time, and changes the period for setting the display electrode pairs to the base potential when the plasma display device is changed to an operating state.

8. A plasma-display-panel driving method, the plasma display panel having a plurality of discharge cells, each discharge cell having a display electrode pair formed of a scan electrode and a sustain electrode, a field period being divided into a plurality of sub fields, each sub field having an address period for allowing the discharge cell to selectively generate an address discharge and a sustain period for allowing the discharge cell having generated the address discharge to generate a sustain discharge by a number of times corresponding to a brightness weight, the plasma-display-panel driving method comprising:
applying a sustain pulse varying from a base potential to a potential causing the sustain discharge in the sustain period to the display electrode pairs; and
disposing a period for setting the display electrode pairs to the base potential between the sustain pulse for causing a final sustain discharge and a previous sustain pulse thereof.

9. The plasma-display-panel driving method of claim 8, further comprising:

applying a voltage for reducing the potential difference between electrodes of the display electrode pairs to the display electrode pairs in a predetermined time interval after a voltage for generating the final sustain discharge is applied to the display electrode pairs.

10. The plasma-display-panel driving method of claim 8, further comprising:
changing a period for connecting the display electrode pairs to the base potential depending on a lighting ratio in the sub field.

11. The plasma-display-panel driving method of claim 10, further comprising:
changing the period for connecting the display electrode pairs to the base potential based on a comparison result of a predetermined threshold value with the lighting ratio of the discharge cells.

12. The plasma-display-panel driving method of claim 8, further comprising:
measuring an accumulated time of the time when the plasma display panel is electrified; and
changing the period for setting the display electrode pairs to the base potential depending on the measured accumulated time.

13. The plasma-display-panel driving method of claim 8, further comprising:
extending the period for setting the display electrode pairs to the base potential when the accumulated time exceeds a predetermined time.

14. The plasma-display-panel driving method of claim 13, further comprising:
performing continuously the driving operation until the plasma display device is temporarily changed to a non-operating state when the accumulated time exceeds the predetermined time, and changing the period for setting the display electrode pairs to the base potential when the plasma display device is changed to an operating state.

* * * * *

UNITED STATES PATENT AND TRADEMARK OFFICE
CERTIFICATE OF CORRECTION

| | | |
|---|---|---|
| PATENT NO. | : 8,154,542 B2 | Page 1 of 1 |
| APPLICATION NO. | : 12/088783 | |
| DATED | : April 10, 2012 | |
| INVENTOR(S) | : Hidehiko Shoji et al. | |

It is certified that error appears in the above-identified patent and that said Letters Patent is hereby corrected as shown below:

In column 32, line 61 of the Letters Patent, in claim 8 (original claim 8), "period to the display electrode pairs; and" should read:

--period to the display electrode pairs;

applying a voltage for reducing a potential difference between the display electrode pairs after applying the sustain pulse for making last sustain discharge to the display electrode pairs; and--

Signed and Sealed this
Thirtieth Day of October, 2012

David J. Kappos
*Director of the United States Patent and Trademark Office*